June 23, 1953 B. A. WITTKUHNS ET AL 2,642,785
MACHINE FOR MAKING PAPER CONTAINERS
Filed April 6, 1949 16 Sheets-Sheet 1
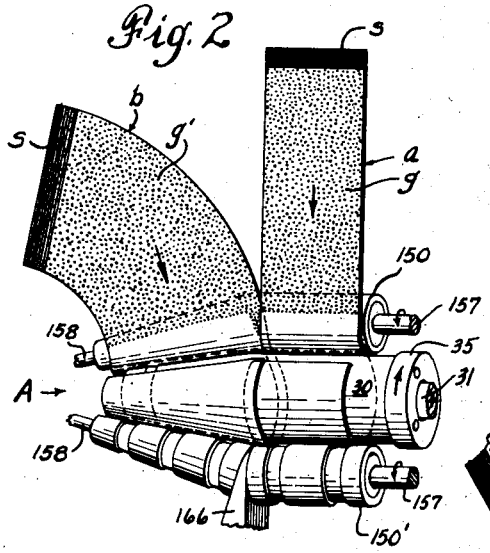
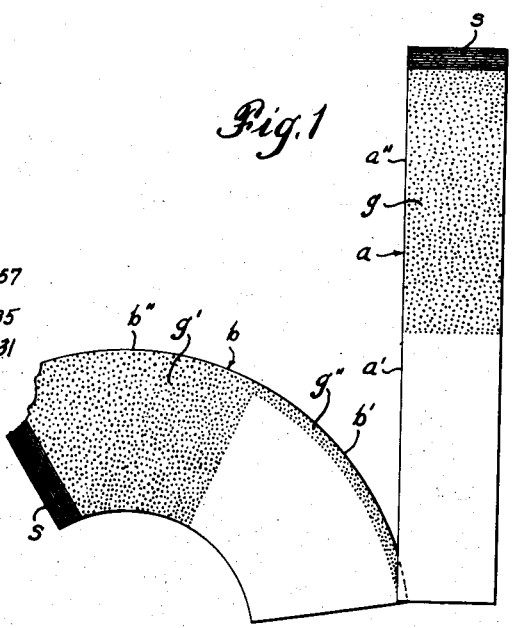
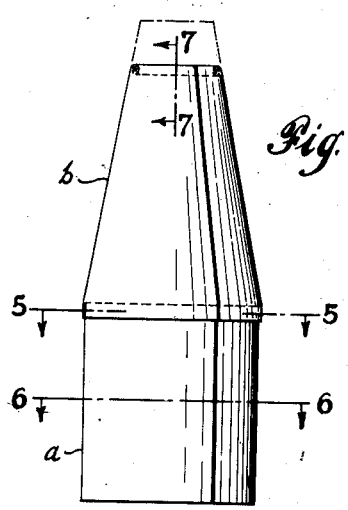
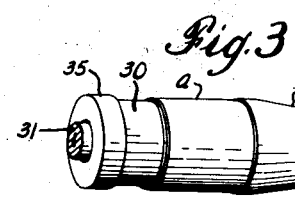
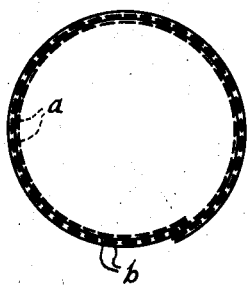
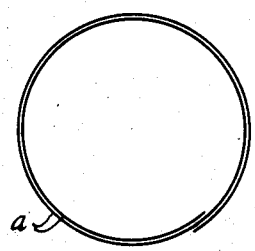
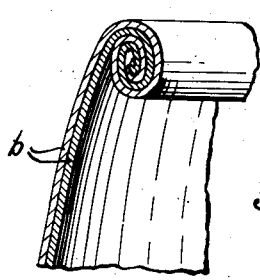
INVENTORS
BRUNO A. WITTKUHNS
H. GEORGE D. NUTTING
GILBERT F. HILL
BY
Austin, Wilhelm + Carlson
ATTORNEYS

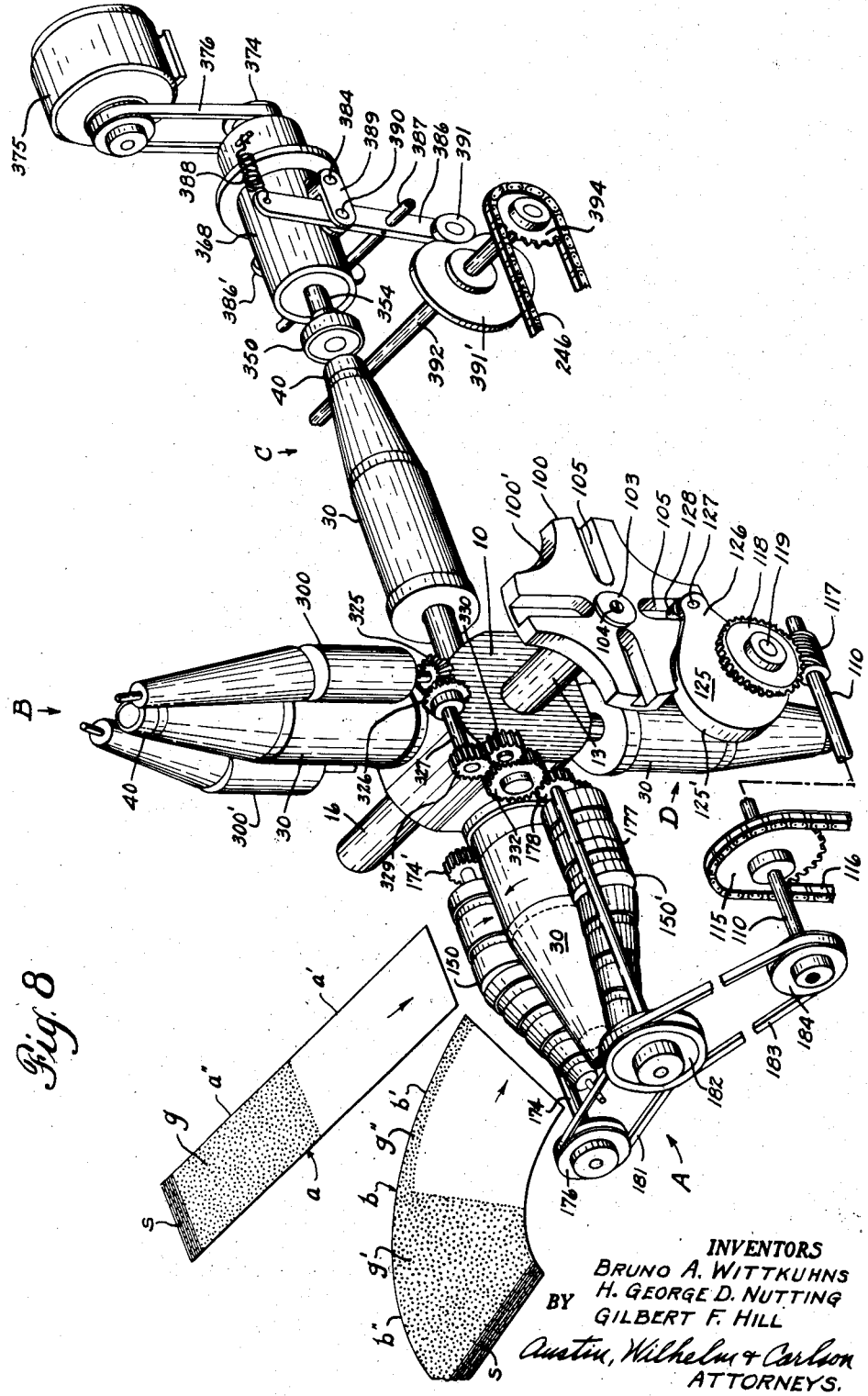

INVENTORS
BRUNO A. WITTKUHNS
H. GEORGE D. NUTTING
GILBERT F. HILL
BY Austin, Wilhelm & Carlson
ATTORNEYS.

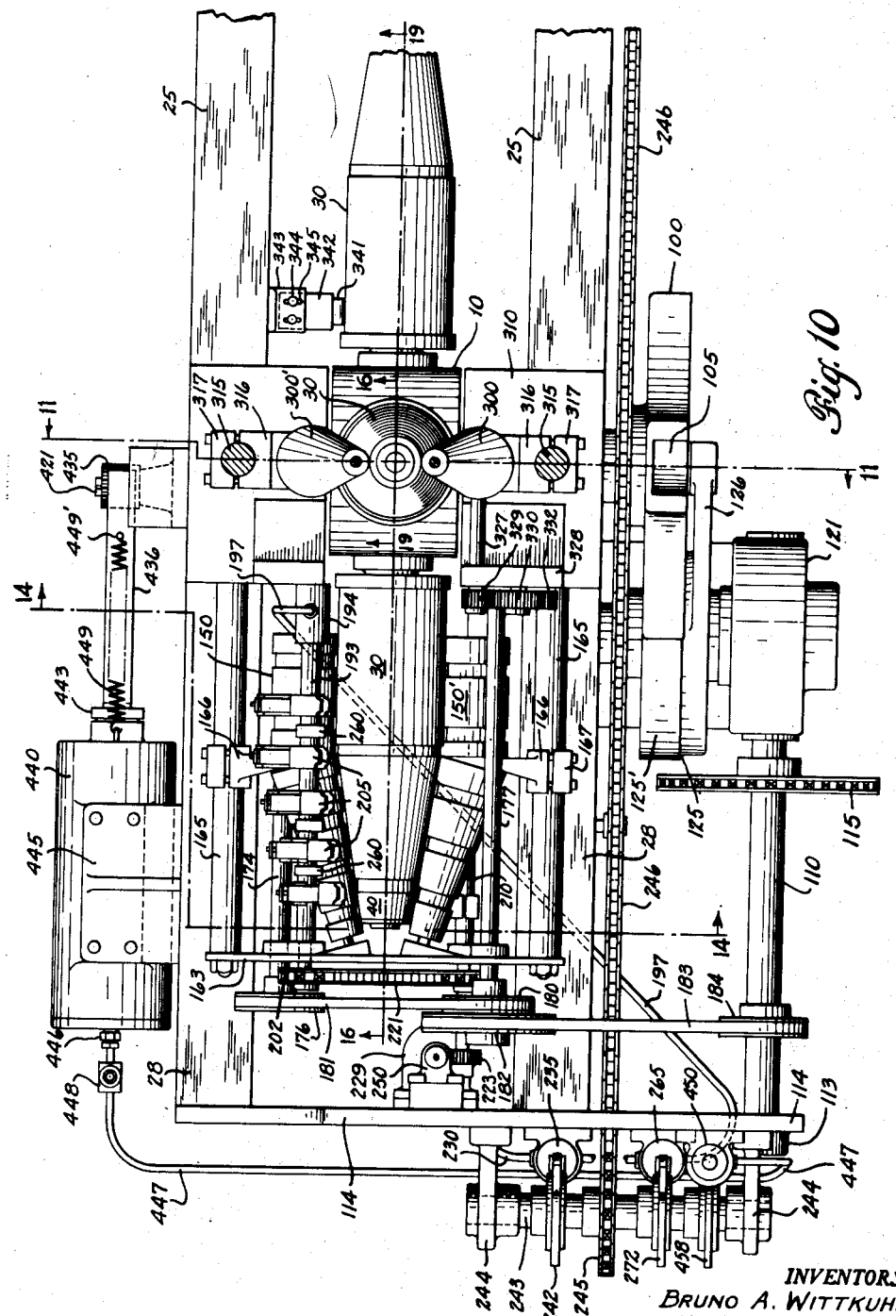

June 23, 1953
B. A. WITTKUHNS ET AL
2,642,785
MACHINE FOR MAKING PAPER CONTAINERS
Filed April 6, 1949
16 Sheets-Sheet 5
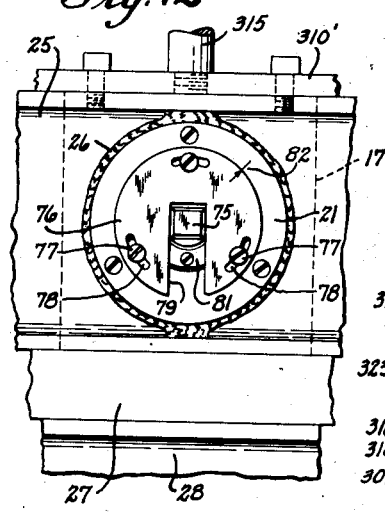
Fig. 12
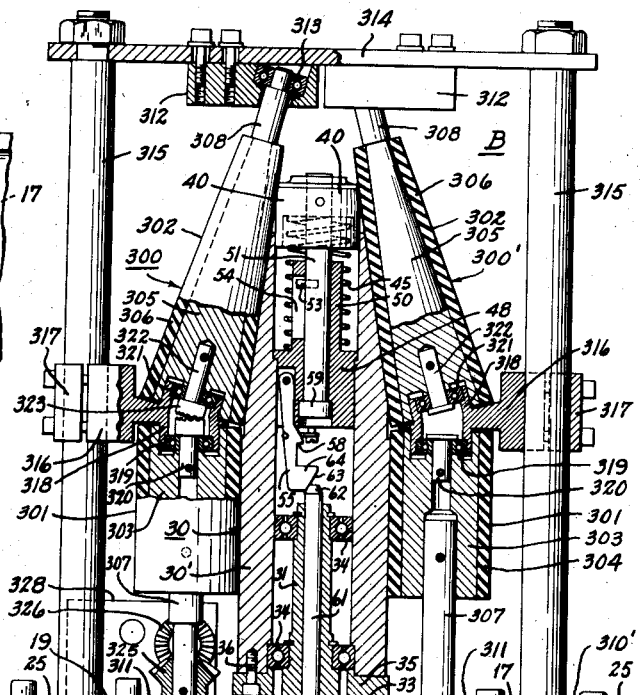
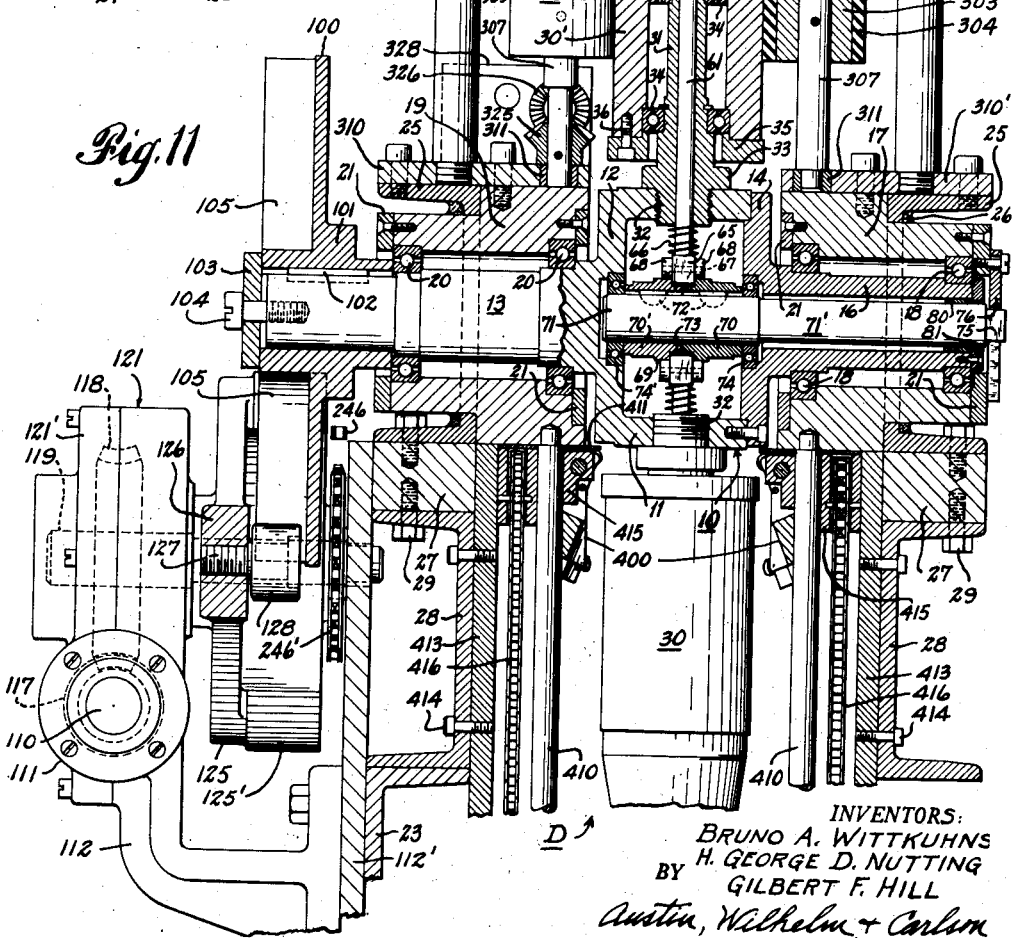
Fig. 11
INVENTORS:
BRUNO A. WITTKUHNS
H. GEORGE D. NUTTING
BY GILBERT F. HILL
Austin, Wilhelm + Carlson
ATTORNEYS.

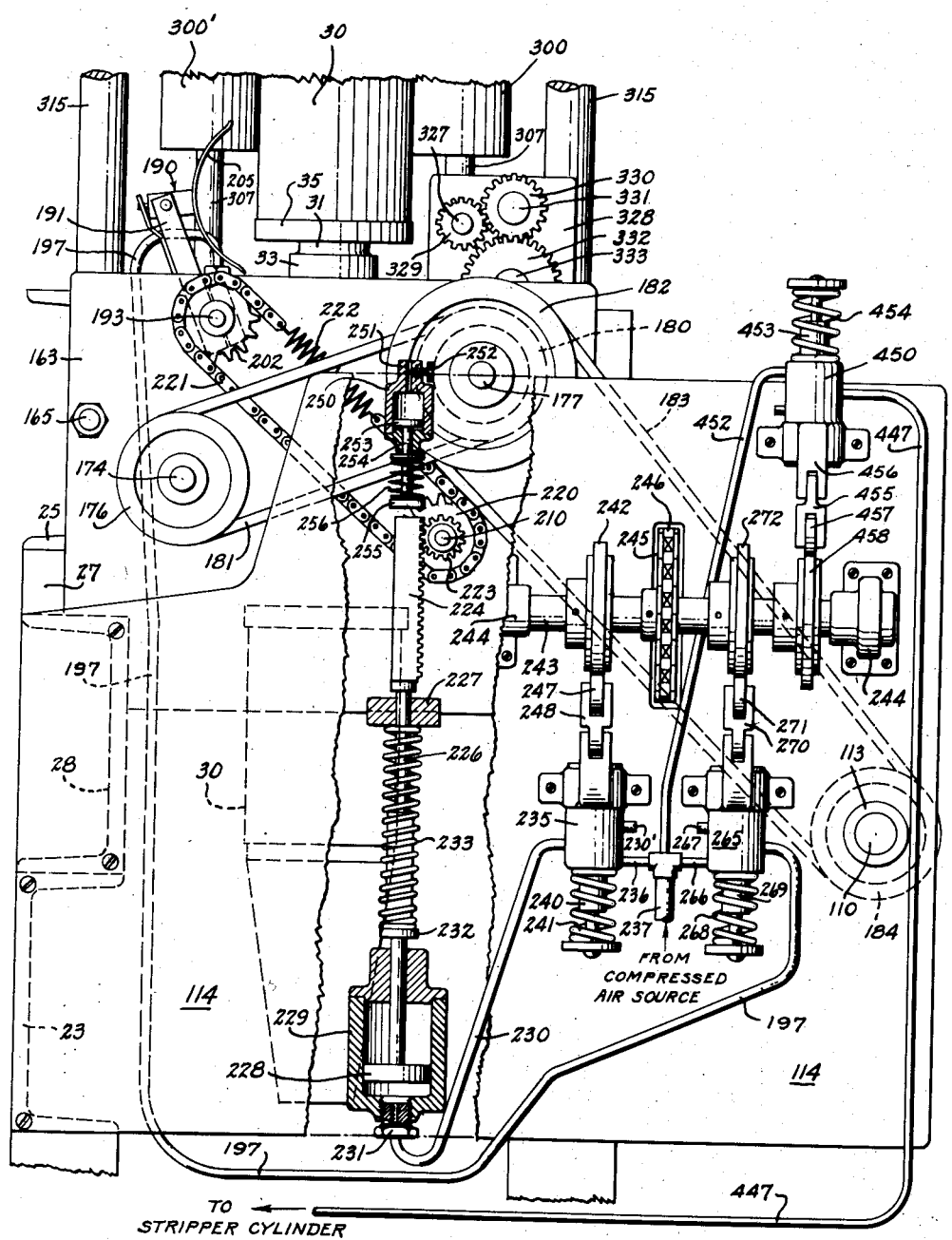

INVENTORS
BRUNO A. WITTKUHNS
H. GEORGE D. NUTTING
GILBERT F. HILL
BY Austin, Wilhelm & Carlson
ATTORNEYS.

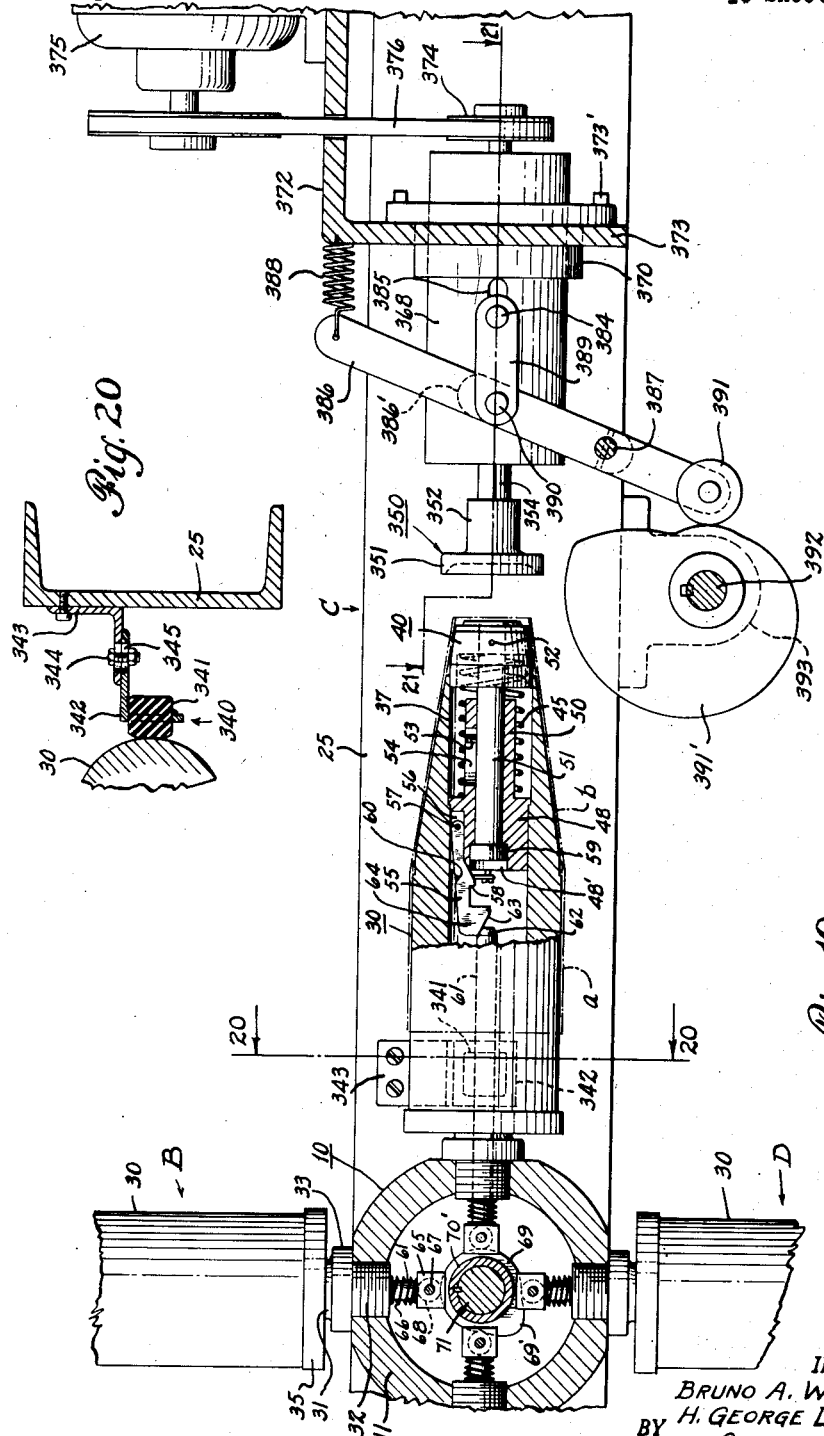

June 23, 1953 B. A. WITTKUHNS ET AL 2,642,785
MACHINE FOR MAKING PAPER CONTAINERS
Filed April 6, 1949 16 Sheets-Sheet 13
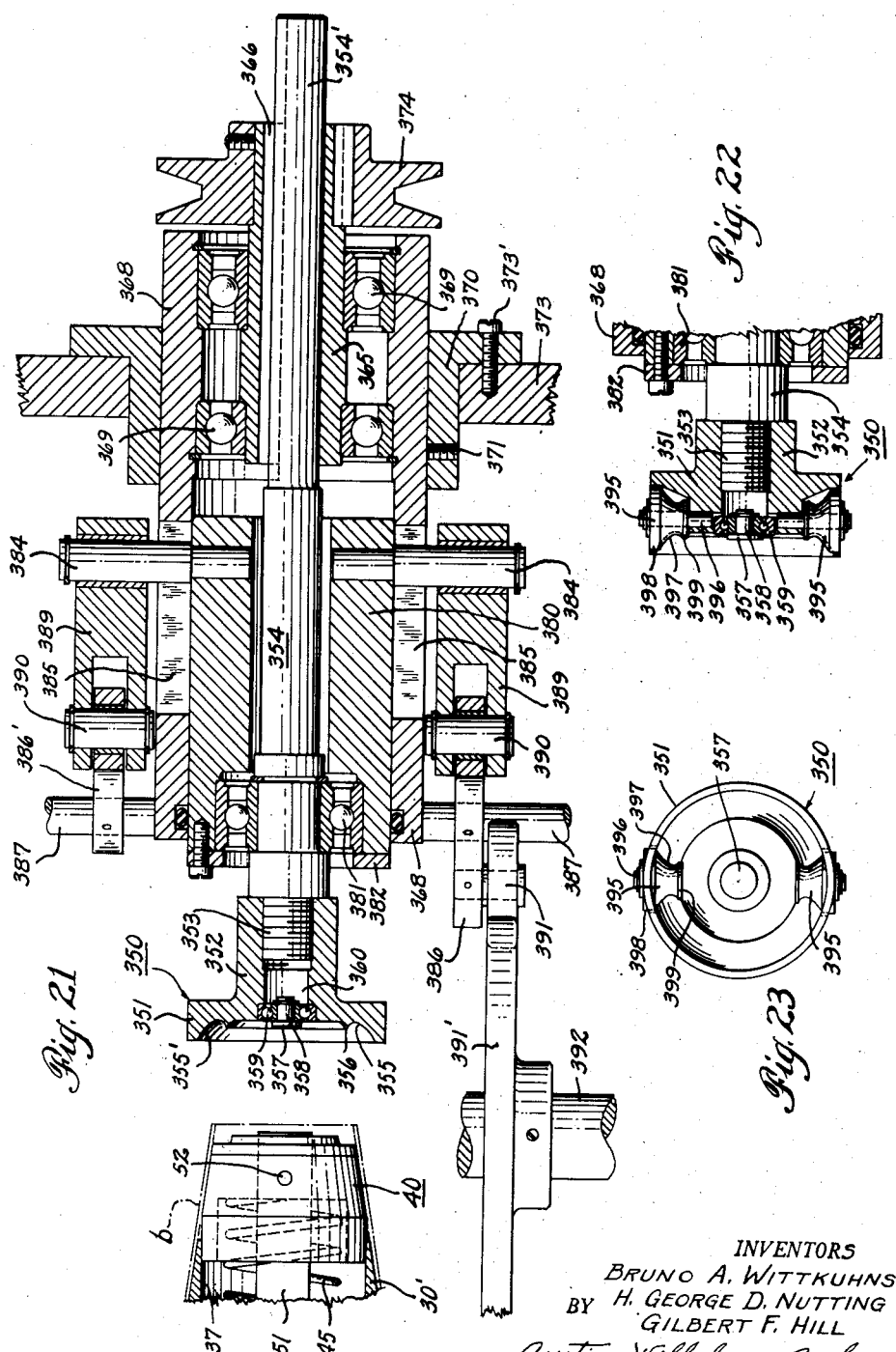
INVENTORS
BRUNO A. WITTKUHNS
BY H. GEORGE D. NUTTING
GILBERT F. HILL
Austin, Wilhelm & Carlson
ATTORNEYS.

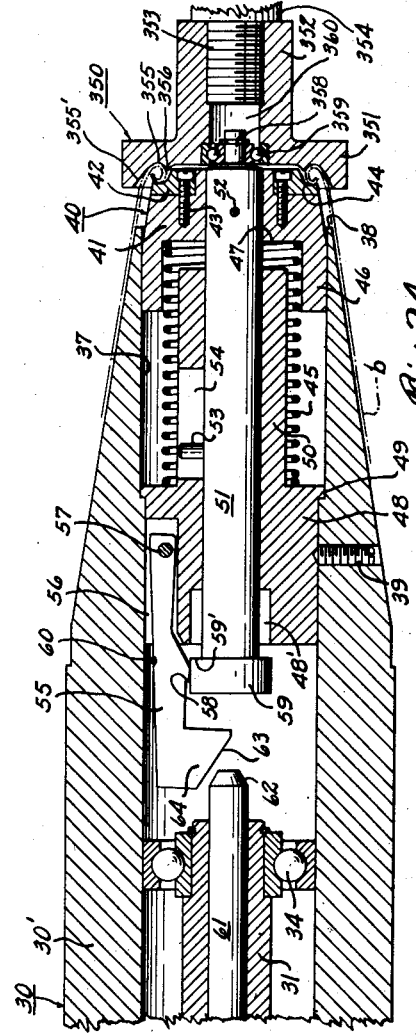
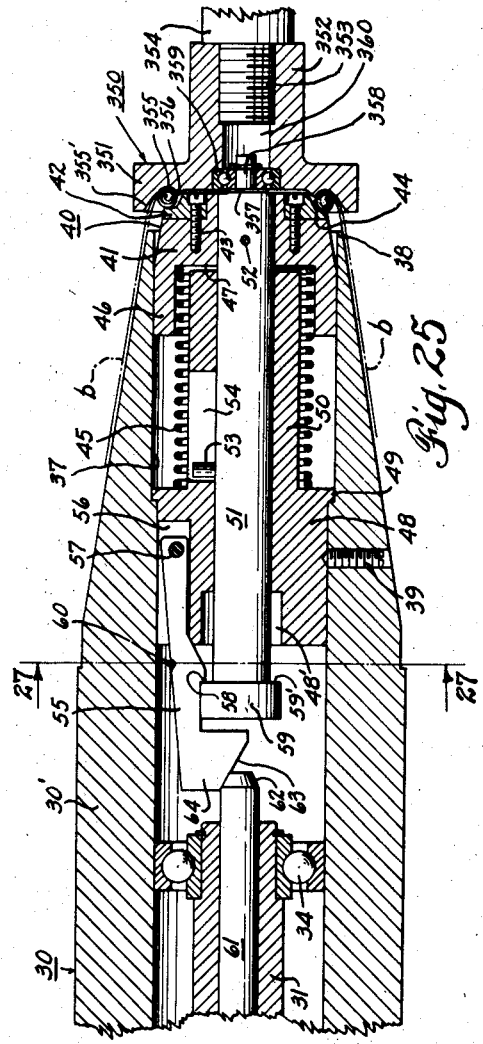
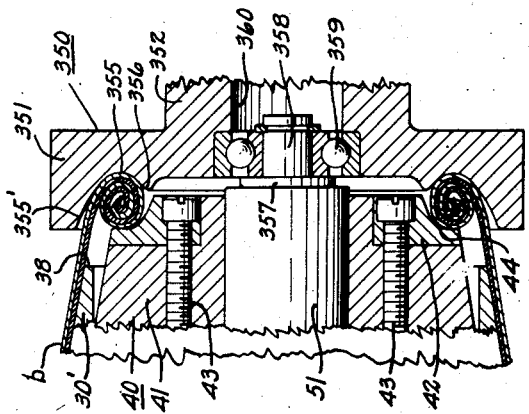
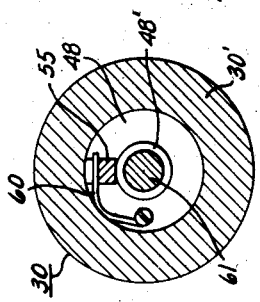

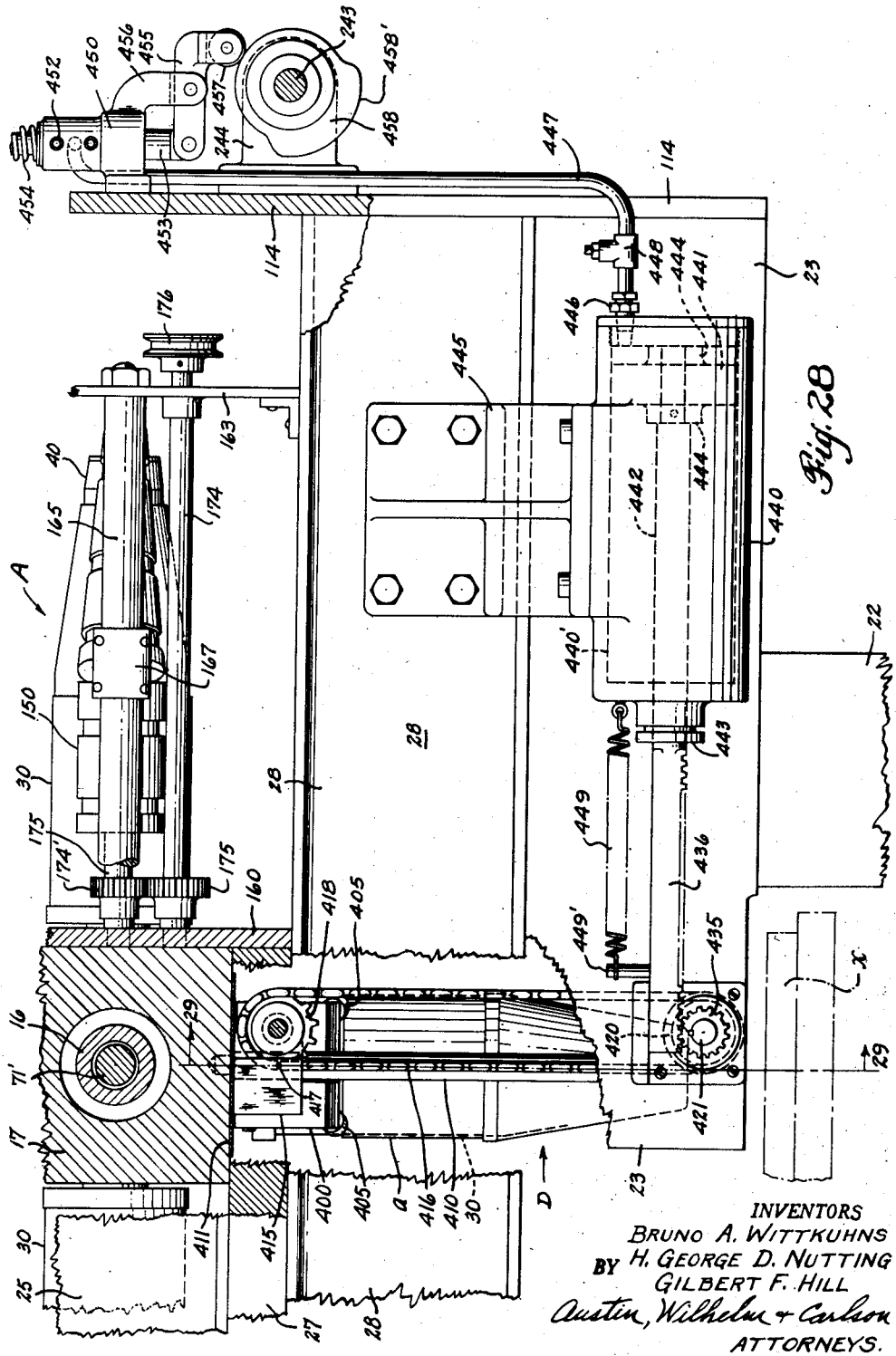

June 23, 1953  B. A. WITTKUHNS ET AL  2,642,785
MACHINE FOR MAKING PAPER CONTAINERS
Filed April 6, 1949  16 Sheets-Sheet 16
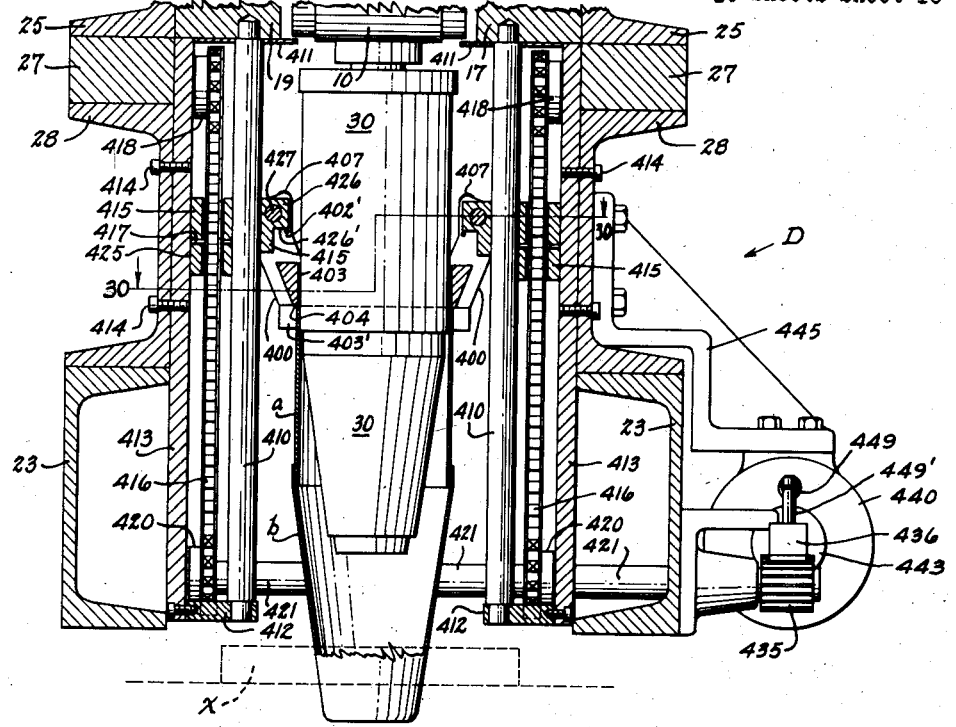
Fig. 29
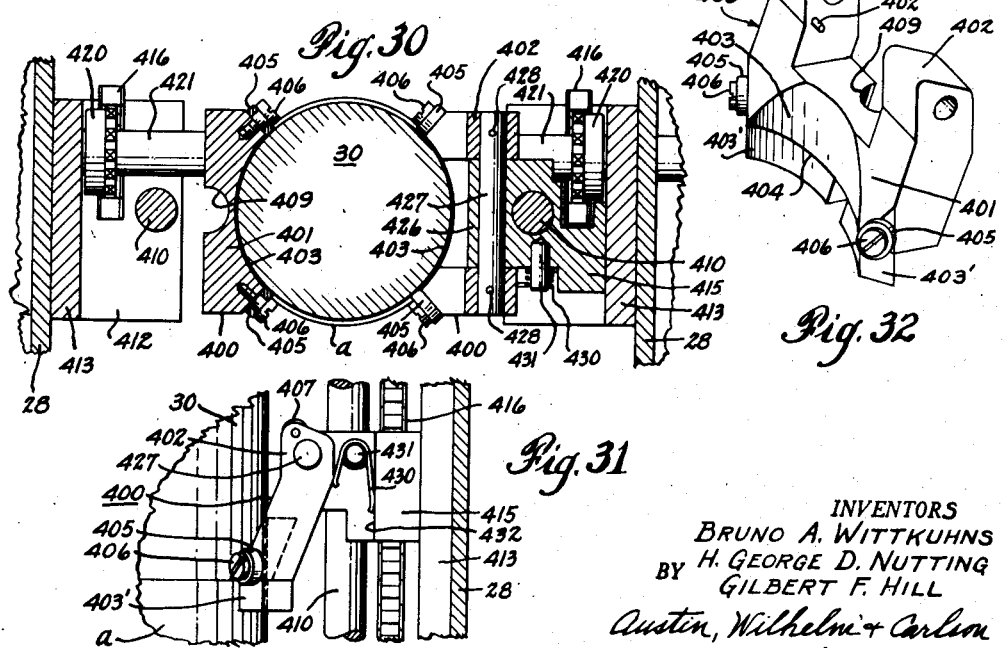
Fig. 30
Fig. 32
Fig. 31
INVENTORS
BRUNO A. WITTKUHNS
BY H. GEORGE D. NUTTING
GILBERT F. HILL
Austin, Wilhelm & Carlson
ATTORNEYS.

Patented June 23, 1953

2,642,785

UNITED STATES PATENT OFFICE 2,642,785

MACHINE FOR MAKING PAPER CONTAINERS

Bruno A. Wittkuhns and H. George D. Nutting, Summit, and Gilbert F. Hill, Madison, N. J., assignors to National Paper Bottle Co. Inc., New York, N. Y., a corporation of New York Application April 6, 1949, Serial No. 85,781

32 Claims. (Cl. 93—36.5)

This invention relates to a machine for making paper containers, and more particularly to an improved machine for the economical manufacture of paper containers formed from wound paper blanks particularly adapted for the packaging of milk and free flowing materials.

Paper containers have heretofore been made in various shapes and forms for the packaging of milk, juices and other liquid and free flowing materials. Paper containers having the general form of glass bottles, and presenting a cylindrical part from which a truncated part extends, are particularly convenient and desirable for the packaging and transportation of milk and other liquid products since they are suited for filling on standard glass bottles and capping equipment and may be conveniently grasped and carried by the truncated neck portion thereof.

Paper containers simulating glass bottles may be formed from paired blanks comprising a substantially rectangular blank paired with a generally arcuate shaped blank, the two blanks being wound together to form a container body of double-ply construction, with the plies of the conical part wound together and interleavened with the plies of the cylindrical part in a manner to form a mid-sectional joint. The paper plies forming the bottle body are bonded by an adhesive layer sandwiched between the plies, and the contracted end of the bottle body is spun over to form an inwardly extending bead to reinforce the mouth end of the bottle body and provide a support for the bottle closure. The large end of the bottle body is closed by a closure disc having a depending skirt, the skirt and the lower end of the bottle body being rolled together to form a rolled bead inset within the lower end of the bottle body as finally formed.

The machine as disclosed in this application embodies a winding station where a rectangular blank paired with an arcuate blank is wound on a rotatable mandrel. At the next succeeding station, the bottle body as wound on the mandrel is ironed and compressed to further smooth and calendar the bottle body, compress the mid-sectional joint and vertical joints thereof, and insure a lasting adhesive bond between the paper plies thereof. At the next succeeding station, the mouth end of the bottle body is spun over into an inwardly rolled firmly compressed bead which defines the pouring and filling mouth of the bottle body and provides a reinforced support for a closure cap therefore. At the next succeeding station the bottle body is stripped from its supporting mandrel.

At subsequent operating stations which may form an integrated part of this machine, mechanisms are provided, as disclosed in our copending application, Serial Number 85,782 filed April 6, 1949, for fluting the neck part and further shape the mouth end thereof in a form to support a closure disc, for preparing and applying a skirted bottom forming disc to the bottle body, for spinning the depending skirt and bottom edge of the bottle body into an inwardly rolled supporting and reinforcing bead, and for ejecting the completed bottle from the machine.

Our copending application Serial Number 85,783, filed April 6, 1949, discloses machine mechanism, which may also form an integrated operating part of the machine shown in this application, for cutting, scoring, printing, gluing and feeding rectangular blanks and arcuate blanks in paired relationship to the winding station of the machine as disclosed in this application.

The mandrels on which the paired blanks are wound and supported until removed therefrom, may be mounted upon a suitable traveling conveyor which operates to advance the spaced mandrels to the successive operating stations. The mandrel supporting conveyor may conveniently comprise a rotatable turret upon which the mandrels are mounted in radial spaced arrangement. With four operating stations as above indicated, the turret may conveniently support four mandrels which may be rotated in an orbital path as defined by the axis of the turret, mechanism being provided for rotating the turret in stages through a defined arc, the successive mandrels being held at the successive operating stations for a predetermined dwelling period sufficient to complete the body forming operations prescribed at each operating station.

The operating mechanisms at the various forming stations are driven in synchronism with each other and with the mechanism which rotates the mandrel supporting turret, the forming mechanisms at the operating stations performing their intended body forming functions during the period the mandrels are in dwelling position at the successive stations. Thus, during the dwelling period, a pair of bottle forming blanks are wound on the mandrel dwelling at the winding station, a second wound bottle body is compressed on its supporting mandrel dwelling at the pressing station, the mouth end of a third bottle body is spun while supported on the mandrel dwelling at the spinning station, and a fourth bottle body is stripped from the mandrel dwelling at the stripping station.

Continuously driven pressure rollers are mounted at the winding station to rotate the mandrel in dwelling position therebetween, and to assist in winding the paired blanks onto the mandrel. Finger assemblies supporting a series of guide fingers are additionally provided, which are swung to embrace the mandrel dwelling at the winding station to positively guide the blanks and insure tight winding thereof on the mandrel at this station. Devices for directing streams of compressed air are also located at the winding station to initially direct the paired advancing blanks into winding engagement with the mandrel at the winding station. Automatic mechanism is provided to swing the finger assemblies and the blank directing devices into operating position the moment the mandrel to be wound has been advanced to dwelling position at the winding station, to hold the finger assemblies and blank directing devices in cooperating relation to the mandrel during its dwelling interval at the winding station, and to swing the finger assemblies and blank directing devices from the orbital path of the mandrel a moment prior to the orbital advance of the wound mandrel from the winding station to the pressing station. The automatic mechanism for thus manipulating the finger assemblies and blank directing devices may be operably connected to the turret driving mechanism for operation in synchronized relation thereto.

The body supporting mandrel, advanced from the winding station to dwelling position at the pressing station, is rotated between a pair of diametrically arranged pressure rollers which are mounted to have pressure rolling engagement with the mandrel supported bottle body. This pressing treatment serves to finally iron and smooth out the surfaces of the bottle body, compresses the cemented inner and outer plies thereof into a permanent unitary bond, and compresses the medial joint and the vertical joints of the paper plies compactly together to provide a leak-proof bottle body.

From the pressing station, the pressed bottle body supported on its mandrel is advanced to the dwelling position at the spinning station, where a rotatively mounted spinning head is axially advanced into spinning engagement with the mouth or radially outward end of the bottle body. Formation of the bead at the mouth end of the bottle body is further facilitated by the provision of an anvil shaped groove associated with the spinning nose of the mandrel which is held against rotation at the spinning station. The spinning nose of the mandrel is maintained in normally extending position while in dwelling position at the winding station and the pressing station. Axial advance of the spinning head at the spinning station pushes the resiliently supported spinning nose inwardly of the mandrel shell as the mouth spinning operation progresses. When the mouth spinning operation has been completed, the spinning nose is automatically locked in retracted position within the mandrel shell to prevent reopening of the completed bead due to the spring pressure on the retracted nose. The spinning head located at the spinning station may be continuously rotated, but is axially advanced into spinning engagement with the bottle body, and then retracted from the spun mouth of the bottle body, all during the interval of dwell of the bottle body supporting mandrel at the spinning station. Mechanism for axially manipulating the spinning head may be driven from and in timed relation with the mechanism which rotates the mandrel supporting turret.

Stripping devices are provided at the stripping station which are automatically operated by mechanism which moves the stripping devices into gripping engagement with the base or radially inward end of the bottle body the moment the bottle body supporting mandrel arrives at the stripping station, then manipulates the stripping devices in a manner to exert a stripping push on the bottle body to effectively remove the bottle body from the mandrel over the truncated conical end thereof, and then returns the stripping devices to starting position, free of the path of movement of the mandrel, an instant before the unloaded mandrel moves from the stripping station toward the winding station. While the mandrel moves from the stripping station to the winding station mechanism within the turret hub releases the retracted nose of the mandrel, so that the mandrel arrives at the winding station in fully expanded condition.

During the interval of dwell of the successive mandrels at the successive operating stations, three bottle forming operations are performed simultaneously, and a formed bottle body is simultaneously stripped and removed from the mandrel supporting turret. When the mandrel supporting turret has made a complete revolution, each mandrel thereof will have received a pair of body forming blanks and discharged the formed bottle body from that mandrel. Thus, when the turret carries four radially extending mandrels, four bottle bodies will have been produced when the turret has made one complete revolution. This improved machine is constructed to permit the formation of approximately twenty to thirty bottle bodies per minute, the turret having a dwell interval of not more than one and one-half to two seconds during which the bottle body forming operations are performed, and a stage-to-stage advance interval of approximately one-half to one second.

An object of this invention is to provide an improved machine for forming wound bodies from paired paper blanks automatically, economically and at high production speeds.

Another object of this invention is to provide an improved machine for making paper container bodies having a carrier supporting a series of rotatable mandrels, a plurality of spaced operating stations, and drive mechanism for advancing the successive mandrels in coordinated stages to and from dwelling position at the successive operating stations.

Another object of this invention is to provide an improved machine for forming container bodies from paired paper blanks which includes, a rotatively mounted turret having body supporting mandrels arranged in radial spaced relationship, body forming stations spaced along the path of orbital travel of the turret supporting mandrels, and mechanism for rotating said turret to successively advance the mandrels to and from predetermined dwelling position at the successive operating stations.

Another object of this invention is to provide an improved machine for winding paired adhesive coated blanks into a tubular body, including a conveyor supported mandrel, and a winding station at which the body forming blanks are wound on the mandrel held in dwelling position at the winding station, said winding station including cooperating pressure rollers and finger assemblies cooperating to guide and direct the paired blanks in wound position on the mandrel.

Another object of this invention is to provide an improved machine for winding a blank into tubular form, including a conveyor supported mandrel and a winding station, drive mechanism for said conveyor operative to advance the mandrel to and from winding position at the winding station with a predetermined time dwell of the mandrel at the winding station, driven pressure rollers for rotating the mandrel as moved into winding position therebetween, upper and lower finger assemblies each having a plurality of guide fingers movable into mandrel embracing position to guide the adhesive coated blanks being wound thereon, and means for automatically manipulating said finger assemblies into and out of mandrel embracing position during the interval of dwell of the mandrel at the winding station.

Another object of this invention is to provide an improved machine for winding paired adhesive coated blanks into tubular form, including a conveyor supported mandrel and a winding station, drive mechanism for the conveyor operative to advance the mandrel to and from the winding station with a predetermined time dwell of the mandrel at the winding station, driven pressure rollers for rotating the mandrel and for guiding the paired blanks around the mandrel, and pneumatic means for directing the advancing ends of the paired blanks into winding position.

Another object of this invention is to provide an improved container body forming machine including, a pressing station, a mandrel designed to support a container body thereon, a conveyor on which the body supporting mandrel is rotatably mounted, drive mechanism for said conveyor operative to advance the mandrel to and from the pressing station with a predetermined time dwell of the body supporting mandrel at the pressing station, and pressure rollers at the pressing station operative to have pressure rolling engagement with the bottle body dwelling therebetween to insure a permanent adhesive bond between the plies of the paper body.

Another object of this invention is to provide an improved container body forming machine which includes, a conveyor having a body supporting mandrel mounted on said conveyor, a spinning station, drive mechanism for said conveyor operative to advance the mandrel to and from spinning position with a predetermined time dwell of the body supporting mandrel at the spinning station, a rotatably driven spinning head at the spinning station, and mechanism for automatically moving the spinning head into and out of spinning engagement with the mouth end of the container body during its dwelling position at the spinning station.

Another object of this invention is to provide an improved mandrel on which container bodies may be wound and formed, said mandrel comprising a container body supporting shell having a retractable spinning nose, resilient means for normally retaining the spinning nose in extended position to provide support for a section of the container body, latch means within the mandrel shell for automatically latching the spinning nose in retracted position, and means extending from the base end of the mandrel for manipulating said latch means to release the spinning nose from its retracted position.

Another object of this invention is to provide an improved container body forming machine including, a rotatable turret having a plurality of spaced radially extending mandrels mounted on the hollow hub section thereof, each of said mandrels comprising a container body supporting shell having a retractable spinning nose, resilient means for normally retaining the spinning nose in extended position to provide support for a section of the container body, latch means within the mandrel shell for automatically latching the spinning nose in retracted position, a rod extending from the base end of the mandrel for manipulating said latch means to release the spinning nose from its retracted position, and cam means within the hollow hub section of the turret for manipulating said latch release rod at a predetermined point during the rotative travel of said turret.

Another object of this invention is to provide improved mechanism for spinning the end of a tubular paper body into a rolled bead, said mechanism including a mandrel comprising a paper body supporting shell and a retractable spinning nose, a bead forming groove in the end of said spinning nose, resilient means for normally retaining said nose in extended position to provide support for a section of the paper body, a rotatably mounted spinning head having a bead forming means, mechanism for automatically advancing the spinning head into spinning engagement with the paper body, and means associated with said spinning head for pressing said spinning nose into retracted position within the mandrel shell during the spinning operation.

Another object of this invention is to provide an improved container body forming machine including, a conveyor designed to support a container body thereon, a stripping station, conveyor drive mechanism for advancing the paper body supporting mandrel to and from the stripping station with a predetermined time dwell of the body supporting mandrel at the stripping station, reciprocably mounted stripping dogs at the stripping station, automatic mechanism for stroking and returning said stripping dogs along the mandrel body during the interval of dwell of the mandrel at the stripping station, and means for retaining said stripping dogs spaced from the path of travel of the mandrel when the latter is advancing to and from the stripping station.

Another object of this invention is to provide an improved mechanism for stripping a container body from a mandrel on which it is wound including, a pair of stripping dogs each having a stripping edge designed to engage the base end of the tubular body as wound on the mandrel, guide blocks for swingably supporting said stripping dogs, means for guiding the reciprocating movement of said guide blocks and stripping dogs, driving mechanism for reciprocating said guide blocks and stripping dogs axially along the mandrel, roller means associated with said stripping dogs operative to maintain the stripping edges thereof out of marring contact with the mandrel body, means for resiliently retaining the stripping edges of the stripping dogs in body engaging position during the stripping stroke, and means for swinging the stripping dogs away from the mandrel when the stripping operation has been completed.

Other objects and advantages of this invention will become apparent as the disclosure proceeds.

Although the characteristic features of the invention will be particularly pointed out in the claims, the invention itself, and the manner in which it may be carried out, may be better understood by referring to the following description taken in connection with the accompanying drawings forming a part thereof, in which Fig. 1 is a plan view of the rectangular blank and arcuate blank as prepared and arranged in paired relationship ready for feeding into the winding mechanism of the machine.

Fig. 2 is a diagrammatic view in plan perspective of the paired blanks as they would generally appear when being wound on the mandrel in dwelling position at the winding station of the machine.

Fig. 3 is a diagrammatic view in plan perspective of the paired blanks as wound into container body form, with body supporting mandrel in dwelling position at the spinning station where the mouth end of the body is spun into an inturned bead.

Fig. 4 is a side elevational view of the bottle body as formed on the machine disclosed in this application.

Fig. 5 is a cross sectional view of the bottle body showing the interleavened relationship of the overlapping plies of the cylindrical part and truncated conical part, forming the mid-sectional seam of the bottle body as viewed along line 5—5 of Fig. 4.

Fig. 6 is a cross sectional view taken through the cylindrical part of the bottle body showing the double ply construction thereof as the same would appear when viewed along line 6—6 of Fig. 4.

Fig. 7 is an enlarged fragmentary sectional view particularly showing the rolled bead at the mouth end of the tubular body as the same would appear when viewed along line 7—7 of Fig. 4.

Fig. 8 is a schematic, isometric view to diagrammatically illustrate the position of the various operating stations with reference to the mandrel supporting turret, this view showing only some of the mechanisms forming a part of the machine assembly.

Fig. 10 is a plan view of the machine.

Fig. 11 is a vertical transverse section of the machine taken on line 11—11 of Fig. 10, this view showing certain details of the turret mounting, certain parts of the turret driving mechanism, certain details of the mechanisms at the pressing station and at the stripping station, certain details of the mandrel construction, and parts of the mechanism for releasing the spinning nose of the mandrel from retracted position.

Fig. 12 is a fragmentary side elevation of one of the bearing blocks which supports the turret trunnion, this view particularly showing the adjustable plate associated with the trunnion block whereby the hub cam which operates the latch release mechanism associated with the spinning nose of each mandrel may be adjustably oriented as desired.

Figure 9:
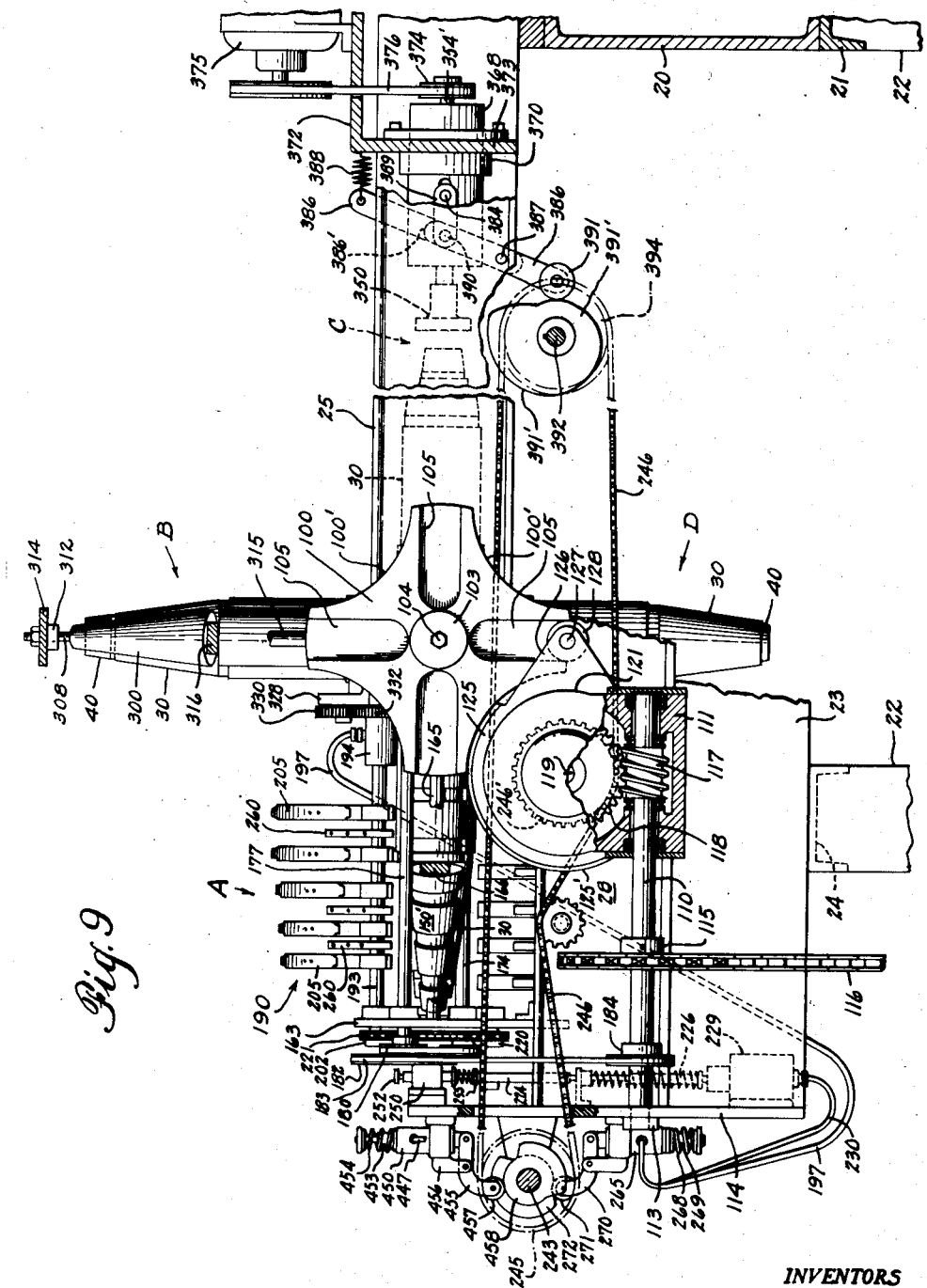
Fig. 9 is a side elevational view of the machine on a reduced scale, as viewed from the power driving side of the machine.

Fig. 13 is a partial end elevation of the machine as viewed from the left of Fig. 9, this view particularly showing the mechanism for swingably manipulating the finger assemblies at the winding station, the mechanism for pneumatically controlling the flow of compressed air to the air arms at the winding station, and the mechanism for controlling the flow of compressed air to the air cylinder which operates the stripping dogs at the stripping station.

Figure 14:
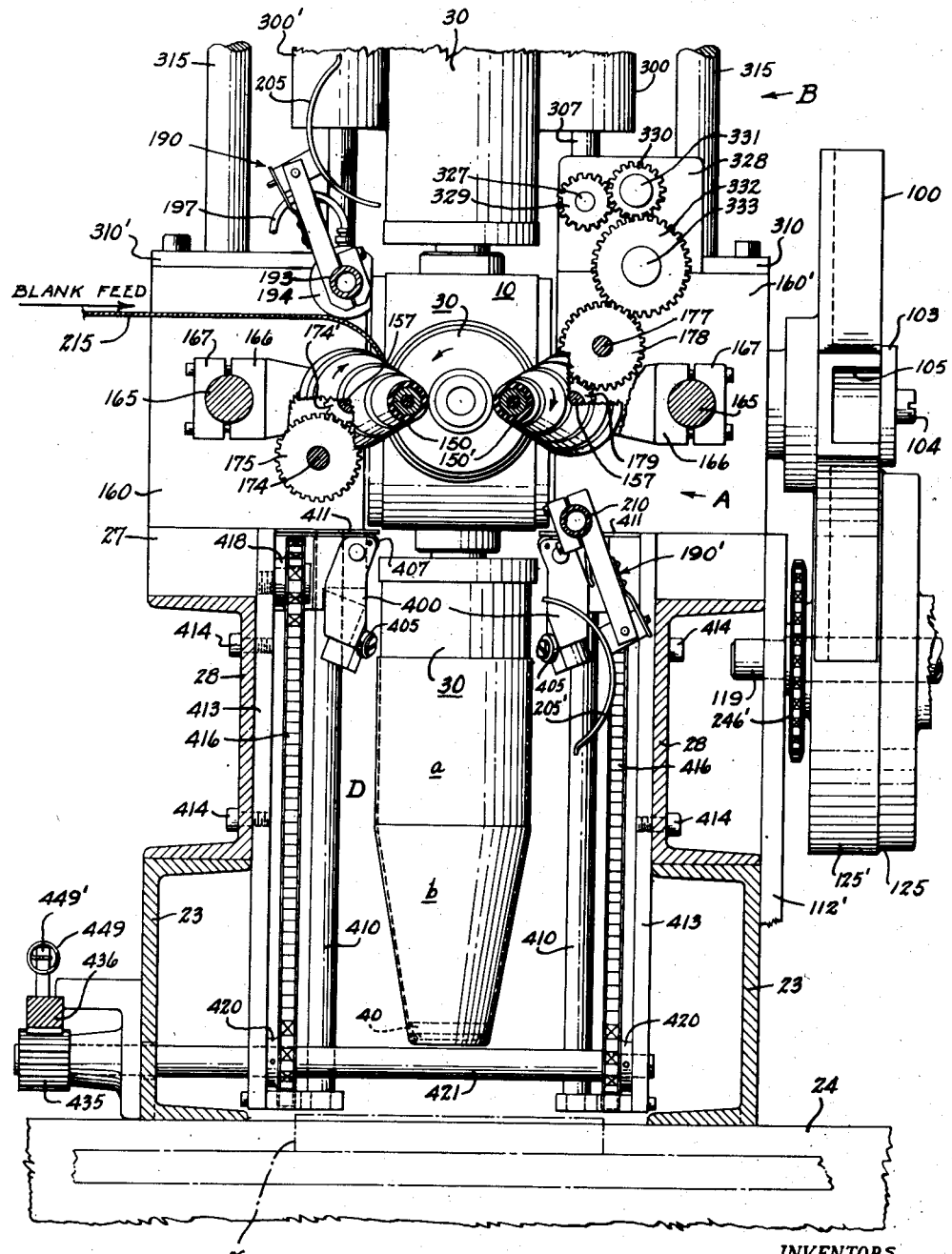

Fig. 14 is a fragmentary vertical section taken on line 14—14 of Fig. 10, this view showing an end section of certain parts of the winding mechanism at the winding station, and certain parts of the operating mechanism at the stripping station in elevation.

Figure 15:
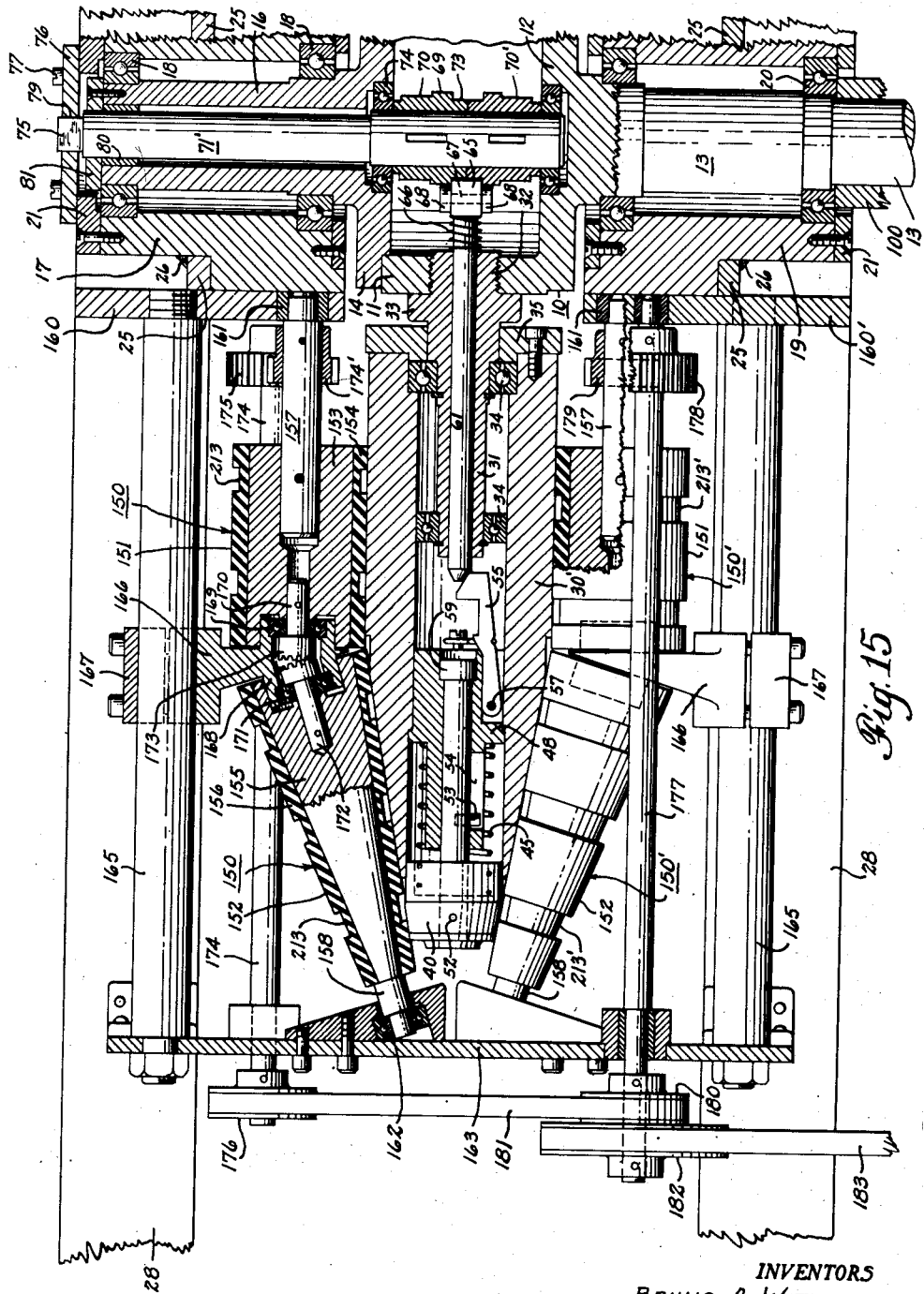

Fig. 15 is a cross section taken along line 15—15 of Fig. 14, this view showing further details of the mechanism at the winding station, the turret mounting and turret supported mandrel at the winding station being shown in section.

Figure 16:
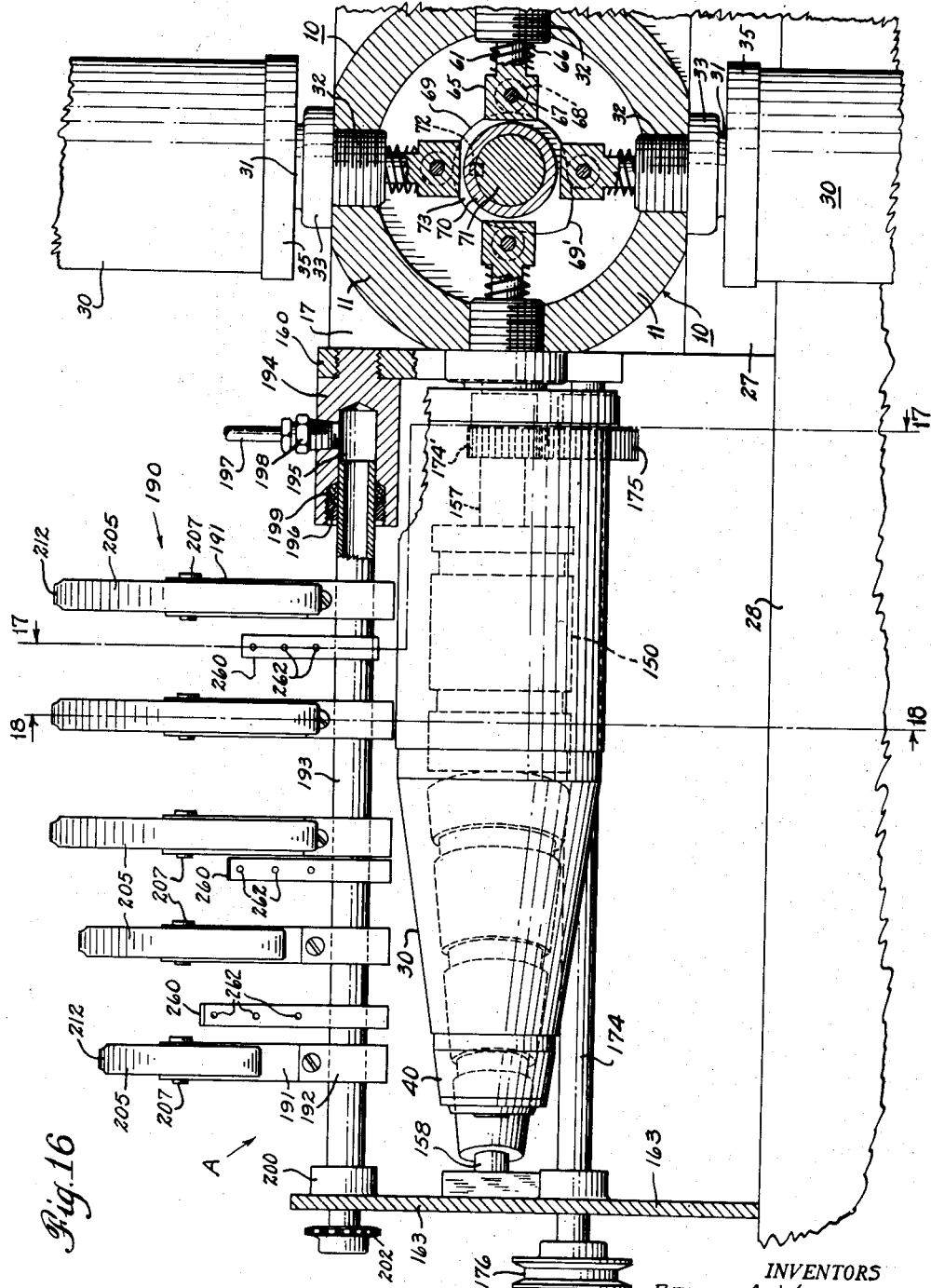

Fig. 16 is a fragmentary longitudinal section taken on line 16—16 of Fig. 10, this view showing further details of the upper finger assembly at the winding station, this view also showing the hub section of the turret in cross section and one of its mandrels in winding position at the winding station.

Figure 17:
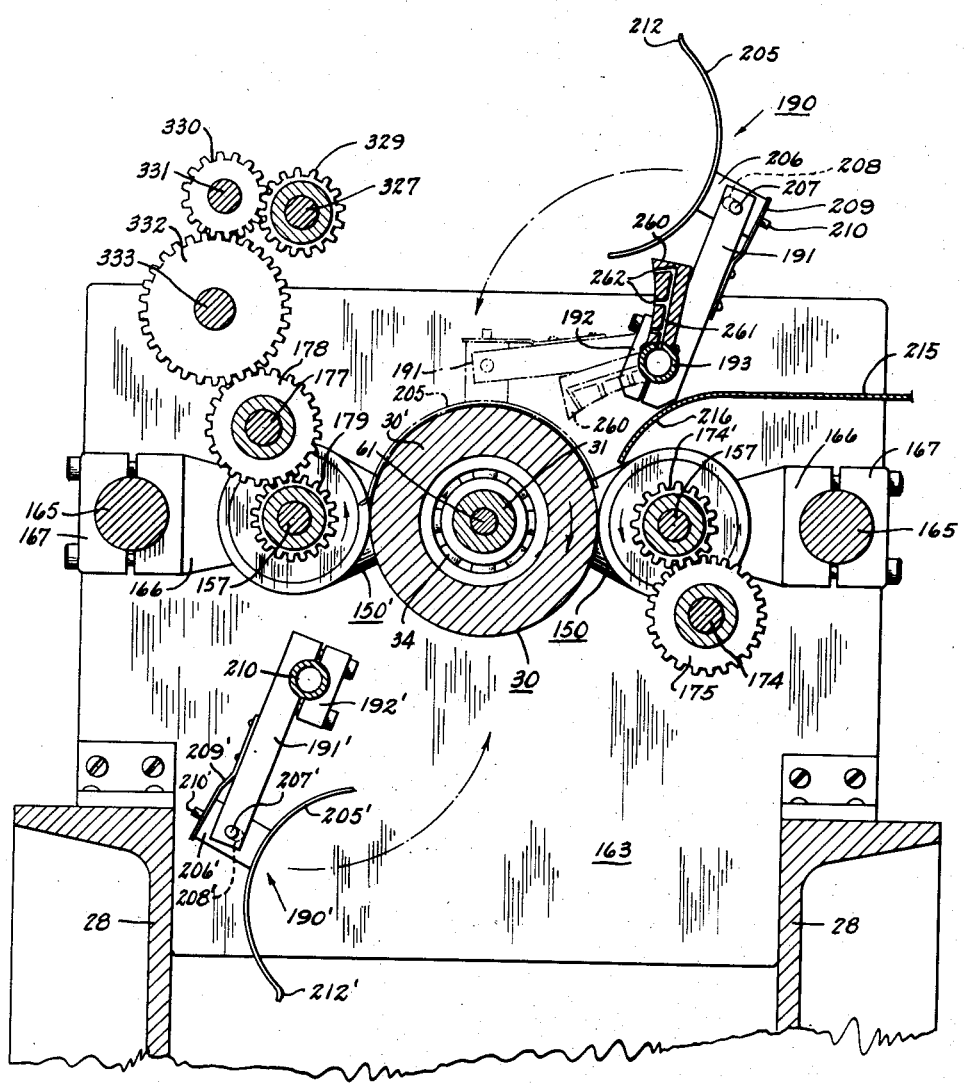

Fig. 17 is a vertical section taken on line 16—16 of Fig. 16, this view showing the driving gears for rotating the pressure rollers at the winding station and for rotating the pressure rollers at the next succeeding pressing station, this view also showing further certain sectional details of the finger assemblies designed to be swung into mandrel embracing position at the winding station.

Figure 18:
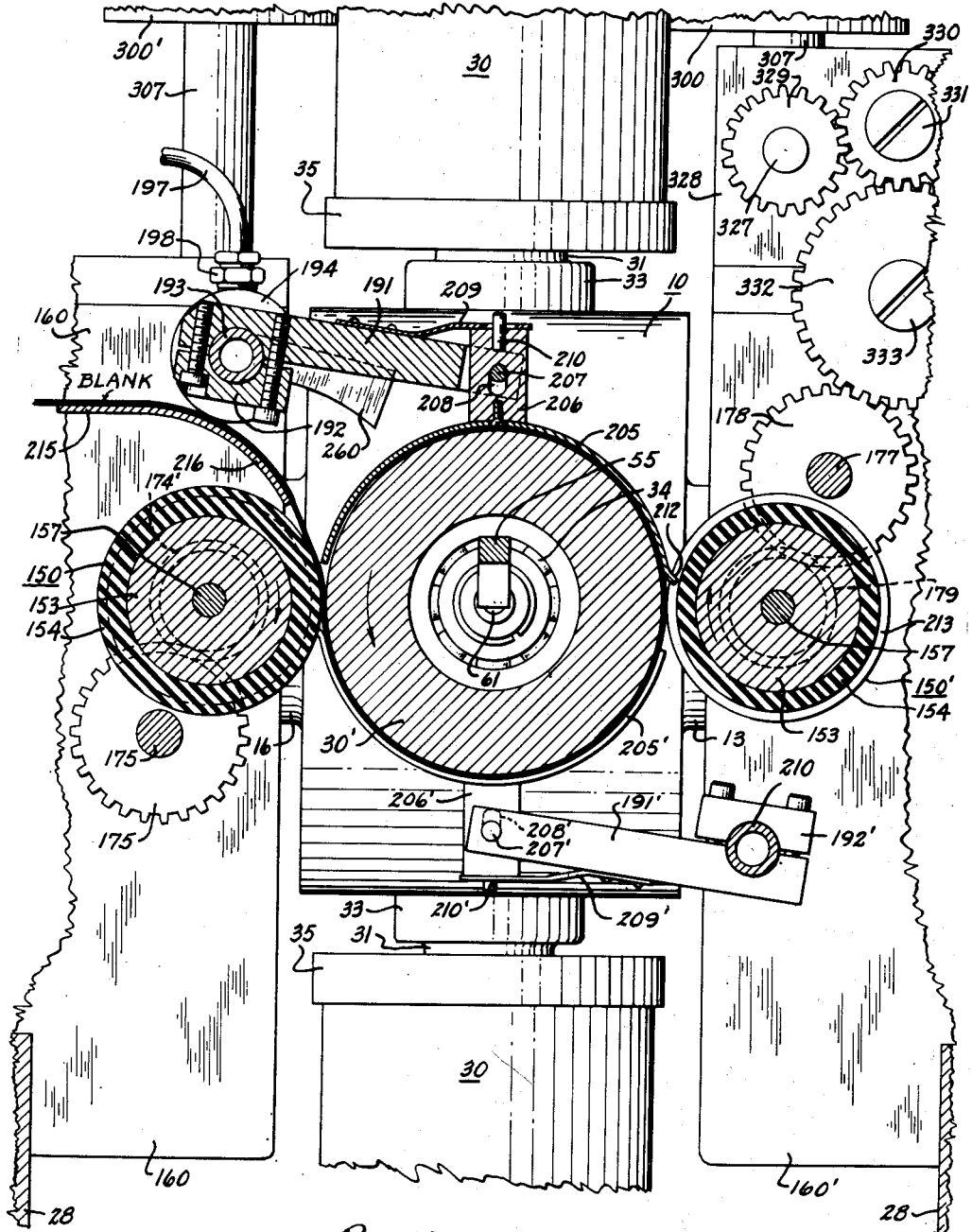

Fig. 18 is a further vertical section taken on line 18—18 of Fig. 16, this view showing the finger assemblies as swung into mandrel embracing position at the winding station.

Fig. 19 is a fragmentary section taken on line 19—19 of Fig. 10, this view showing the hub of the mandrel turret and one of its supported mandrels partially in cross section and in dwelling position at the spinning station, this view also showing the spinning head assembly and associated manipulating mechanism in side elevation.

Fig. 20 is a fragmentary section taken on line 20—20 of Fig. 19, this view showing in further detail the mandrel braking device for holding the mandrel against rotation when in dwelling position at the spinning station.

Fig. 21 is a fragmentary cross section taken on line 21—21 of Fig. 19, this view showing certain structural details of the mouth spinning mechanism and mechanism for axially reciprocating the associated spinning head.

Fig. 22 is a fragmentary cross section of a modified form of a bead spinning head.

Fig. 23 is an end elevation of the modified form of bead spinning head as shown in Fig. 22.

Fig. 24 is an enlarged fragmentary cross section taken axially of the mandrel and the spinning head as arranged when exerting spinning action against the mouth end of the bottle body supported on the mandrel.

Fig. 25 is an enlarged fragmentary cross section taken axially of the mandrel and the spinning head as these mechanisms would appear when the mouth spinning operation has been substantially completed.

Fig. 26 is an enlarged sectional detail of the spinning nose associated with the mandrel and the spinning head when the bead forming operation has been substantially completed.

Fig. 27 is a cross sectional detail taken on line 27—27 of Fig. 25, this view showing the resilient spring which normally operates to retain the latch dog within the mandrel shell against the head of the latch rod associated with the spinning nose of the mandrel.

Fig. 28 is a fragmentary side elevation of the feed side of the machine, certain parts being partially broken away, this view showing one of the mandrels in winding position, another mandrel in body stripping position, and certain parts of the mechanism for stripping the bottle body from the mandrel at the stripping station.

Fig. 29 is a fragmentary vertical section taken on line 29—29 of Fig. 28, this view showing the container body in process of being stripped from the mandrel at dwelling position at the stripping station, this view showing further details of the body stripping mechanism.

Fig. 30 is a horizontal cross section taken on line 30—30 of Fig. 29, this view showing a cross section of the mandrel in dwelling position at the stripping station and further details of the stripping mechanism.

Fig. 31 is a fragmentary side elevation showing one of the stripping dogs and its associated guide block in body stripping position, and Fig. 32 is an isometric view of one of the stripping dogs shown in Figs. 11, 29, 30 and 31.

Similar reference characters refer to similar parts throughout the several views of the drawings and the following descriptive specification.

*The bottle forming blanks*

The method of forming the bottle body, and the construction and operation of this improved machine which forms the bottle body, may best be understood by first examining the form and construction of the blanks from which the bottle body is to be made.

The bottle body, assembled in the form illustrated in Figs. 4, 5, 6 and 7, is formed from two blanks of paper material of the general type used in forming paper containers for milk and other liquids. The cylindrical part of the bottle body is formed from a rectangular shaped blank $a$ and the truncated conical part is formed from an arcuate shaped blank $b$. The rectangular blank $a$ has a coating of adhesive $g$ applied to one side of a half section $a''$ thereof, the other half section $a'$ being free of adhesive. The trailing end of the blank $a$ is provided with a series of closely spaced score lines $s$ extending transversely of the blank to facilitate shaping of the tail end of the blank when rolled into cylindrical form.

The arcuate blank $b$ has one half section $b''$ coated with adhesive $g'$, the other half section $b'$ having only a marginal strip of adhesive $g''$ along the longer arcuate edge thereof. The trailing end of the arcuate blank $b$ is also provided with a series of closely spaced score lines $s$ extending transversely of the blank to facilitate shaping of the trailing end of the blank into truncated conical form.

The rectangular blank $a$ and the arcuate blank $b$ may be cut from large sheets or rolls of selected suitable paper material. The rectangular blank $b$, after being cut to size and scored, may be printed on one side thereof before the adhesive is applied thereto,. A suitable mechanism for cutting, scoring, printing, gluing and feeding paired rectangular and arcuate blanks to this body forming machine is disclosed in our copending application, Serial Number 85,783, filed April 6, 1949.

*Steps in forming the bottle body*

The bottle body as shown in Figs. 4, 5, 6 and 7 is formed from the paired blanks $a$ and $b$ shown in Fig. 1 in a series of steps performed at a series of fixed operating stations to and from which the bottle body in process of formation is transported by a rotatable mandrel supporting turret 10, which is generally illustrated in isometric view at Fig. 8. The rotatable turret 10 carries a plurality of mandrels 30 mounted in radial spaced relation. In the illustration shown in Fig. 8, the machine presents four operating stations.

The rectangular blank $a$ and the arcuate blank $b$ arrive at the winding station A arranged as generally illustrated in Figs. 1 and 2, with the top edge of the rectangular blank $a$ at the advancing end thereof, in overlapping relation to the adjacent arcuate bottom edge of the arcuate blank $b$ in a manner so that the adhesive strip $g''$ associated with the arcuate blank will adhere to the adjacent top edge of the rectangular blank. The mechanism for effecting overlapped alignment and registry of the rectangular blank $a$ and the arcuate blank $b$ is disclosed in our copending application, Serial Number 85,783, filed April 6, 1949.

At the winding station A, the rectangular blank $a$ paired with the arcuate blank $b$, are wound together on the rotatable mandrel 30 located at the winding station A so as to provide a bottle body having a lower cylindrical part and an upper truncated conical part, the paper being wound to provide a double-ply construction with the adhesive coated section $a''$ forming the outer ply, in cementing contact with the section $a'$ forming the inner ply, as indicated in Fig. 6. A pair of pressure rollers 150 and 150' located at the winding station A as diagrammatically illustrated in Figs. 2 and 8, are positioned to exert opposed pressure against the paper material being wound on the mandrel positioned therebetween. The pressure rollers 150 and 150' are power driven and serve to positively rotate the mandrel 30 in pressure contact therewith. In winding the bottle body, the upper edge of the rectangular blank and the lower edge of the arcuate blank are wound together in interleavened relationship as indicated in Fig. 5, thereby producing a liquid-tight adhesively bonded joint. The trailing ends of the rectangular blank and the arcuate blank are last to be wound into bottle formation, the scoring $s$ therein causing these end portions to lose their resiliency and to snugly hug and adhesively adhere to the underlying paper material.

The container body thus wound at the winding station A, is then carried on its supporting mandrel to the pressing station B, which station is provided with a pair of pressure applying rollers 300 and 300' which may be generally similar in form and construction to the pressure rollers 150 at the winding station A. One of the pressure rollers 300 at the pressure station B is positively driven so as to rotate the mandrel and the paper body supported thereon, the pressure rollers 300 and 300' exerting opposed pressure against the wound paper body to insure a positive adhesive bond between the paper plies and the production of a firm and smoothly wound bottle body.

From the pressing station B, the mandrel and the bottle body supported thereon, is rotated to a spinning station C where a spinning head 350 is located, as diagrammatically illustrated in Figs. 3 and 8. At this station, the mandrel 30 supporting the bottle body is held against rotation, and the spinning head 350 is moved into spinning engagement with the mouth end of the bottle body in a manner to curl the paper material inwardly into a rolled bead as indicated in Fig. 7. The rolled bead is tightly wound into a smooth roll to provide a bottle mouth having a circular entry, the paper material being rolled through one and one-half to two complete convolutions.

When the mouth spinning operation has been completed, the mandrel with the bottle body supported thereon is advanced to a stripping station D which is provided with mechanism for stripping the bottle body from its supporting mandrel. At subsequent stations, not shown in this application but fully disclosed in our copending application, Serial Number 85,782, filed April 6, 1949, the conical part of the bottle body is compressed and fluted, the rolled bead at the mouth of the bottle further shaped and compressed, a bottom forming member formed, inserted and spun onto the lower end of the bottle body, and the finished body ejected from the machine.

Mounting for the mandrel supporting turret

The structural details of the mandrel supporting turret 10 are shown more particularly in Figs. 11, 12, 14, 15 and 16. The turret comprises a hollow hub having a casing wall 11 to which the mandrels 30 are secured in radial arrangement. The casing wall has an end wall 12 from which a solid trunnion 13 extends. The other end of the casing wall 11 is enclosed by a detachable end plate 14 which may be bolted thereto, the removable end plate 14 having a hollow trunion 16 extending therefrom in axial alignment with the solid trunnion 13. A fixed bearing block 17, supporting radial thrust bearings 18, rotatably supports the hollow trunnion 16. A corresponding bearing block 19, also supporting radial thrust bearings 20, provides a support for the solid trunnion 13, the hollow trunnion 16 and the solid trunnion 13 being rotatable in the bearing blocks 17 and 19. Each of the bearing blocks 17 and 19 are provided with suitable detachable retainer rings 21 constructed to permit removal of the bearings 18 and 20, and serving, when in position, to prevent any radial or axial shifting movement of the trunnions 13 and 16 and the associated mandrel supporting hub, once the bearing blocks 17 and 19 have been secured in fixed position.

The bearing blocks 17 and 19 may be supported upon any suitable framework forming a part of the machine. As an example, the bearing blocks 17 and 19 may extend through conformed openings in the web portions of a pair of structural channel sections 25 and may be rigidly secured thereto as by welding 26. The channel sections 25 extend rearwardly from the bearing blocks 17 and 19 in parallel relationship, and as shown in Fig. 9, and may be secured to a cross channel 20 which is in turn supported by a cross frame 21 supported upon suitable spaced supporting legs.

The turret supporting ends of the channel sections 25 may rest upon spacer blocks 27 which are in turn supported upon the adjacent ends of a pair of underlying horizontally extending channel shaped frame members 28 to which they are secured as by suitable bolts 29, as shown in Fig. 11. The front end of the frame members 28 may in turn be supported upon a pair of underlying frame members 23 secured to a cross frame 24 supported by suitable supporting legs 22 as shown in Fig. 9. Thus the frame members 28 adjacent the winding station A extend horizontally below the axis of the mandrel supporting turret 10 for the convenient mounting of the winding mechanism at the winding station, while the parallel extending channel frame members 25 adjacent the spinning station C are substantially at the same elevation as the axis of the mandrel supporting turret for the convenient mounting of the bottle mouth spinning mechanism. The supporting legs 22 of the machine may be of any desired length to support the turret at a convenient operating elevation.

Mandrel construction

As shown in Fig. 11, each mandrel 30 comprises a heavy tubular body shell 30', the lower cylindrical section and the upper truncated conical section thereof presenting a smooth exterior surface. The mandrel shell 30' is rotatably supported upon a hollow stub shaft 31 having an enlarged threaded boss 32 at the lower end thereof which is threaded into the casing wall 11 of the turret hub. The hollow stub shaft 31 has an abutment collar 33 formed to seat snugly against the outer face of the hub casing wall 11. The hollow stub shaft 31 supports radial thrust bearings 34 upon which the mandrel shell 30' is rotatably mounted. The mandrel shell 30' has a closure plate 35 secured as by bolts 36 to the end thereof. The plate 35 serves as a retainer for the adjacent thrust bearing and also prevents axial movement of the mandrel shell 30' on its supporting stub shaft 31.

As shown more particularly in Figs. 24 and 25, the mandrel shell 30' is provided with a spinning nose 40 which cooperates with the spinning head 350, located at the spinning station C, to insure the formation of a compactly rolled bead at the mouth end of the paper bottle. Mechanism is contained within the mandrel shell 30' and turret hub for axially manipulating the spinning nose 40 within the mandrel shell 30'.

The spinning nose 40, as shown in Figs. 24 and 25, comprises a core member 41 having a sliding fit within the bore 37 of the mandrel shell 30', the core 41 having a bead forming plate 42 inset into the nose end thereof and secured thereto as by suitable screws 43. The bead forming plate 42 has an accurately formed spinning cavity 44 providing an anvil surface designed to insure the formation of a compactly rolled bead.

At the winding station A and the pressing station B, the spinning nose 40 is projected to extend beyond the terminus end 38 of the mandrel shell 30' so that the upper portion of the conical part of the paper bottle body may be wound thereover. The spinning nose 40 is resiliently maintained in its fully projected position by a coil spring 45 housed within the bore 37 of the mandrel shell 30'. The nose core 41 is provided with a depending skirt 46 within which one end of the coil spring 45 extends, the coil spring 45 seating against the end wall 47 of the nose core 41.

The other end of the coil spring 45 seats against a block 48 within the bore 37 of the mandrel shell 30', the block 48 having a peripheral seating lip 49 to fix its position, the block 48 being removably locked in position by set screw 39 extending through the mandrel shell 30'. The block 48 has an axially extending tubular portion 50 embraced by the coil spring 45. A latch rod 51 extends through an axial bore in the guide block 48, the outer end of the latch rod 51 being secured to the nose core 41 as by pin 52.

Means are provided to axially shift the latch rod 51 to move the spinning nose core 41 and its associated spinning plate 42 from and to fully extending and fully retracted position. Rotational movement relative to the mandrel of the latch rod 51 and nose 40 is prevented by a pin 53 extending from rod 51 into a longitudinally extending slot 54 formed in the tubular portion 50 of the fixed guide block 48.

A pivotally mounted latch dog 55 is provided to releasably latch the spinning nose 40 in fully retracted position. The latch dog 55 is provided with an arm portion which extends into a longitudinal slot 56 formed in the guide block 48 and is hinged to the guide block by a suitable hinge pin 57. The latch dog 55 is provided with a latch shoulder 58 designed to engage the rear edge 59' of the head portion 59 of the latch rod 51 when the nose 40 is in its full retracted position within the mandrel shell 30'.

The latch dog 55 is urged towards the head portion 59 by a spring 60, one end thereof pressing against the latch dog 55 and the other end being fixed to the guide block 48 as shown in Figs. 25 and 27. In Fig. 25 the spinning nose 40 is shown in fully retracted position, with the latch shoulder 58 of the latch dog 55 engaging the rear face 59' of the head portion 59 of the latch rod 51. When the nose 40 is in fully projected position as when at stations A and B, the rear face 59' of the head 59 of the latch rod 51 contacts the bottom face of a cylindrical recess 48' formed in guide block 48.

When the rolled bead at the mouth end of the bottle body has been fully formed at spinning station C, the mandrel 30 is moved by its supporting turret 10 to the stripping station D where the bottle body is stripped from the mandrel, which stripping is facilitated by the fact that the nose 40 is locked in retracted position. After the stripping operation has been performed at station D, the supporting turret moves the unloaded mandrel to the winding station A, at which station the nose core must be fully extended to provide full support for the arcuate paper blank which is to be wound on both the conical section of the mandrel shell 30' and the conical wall of the nose core 40. Means are accordingly provided to release the latch dog 55 from the latch rod 51 so that the coil spring 45 will project the spinning nose as the mandrel is advanced from the stripping station D to the winding station A.

Mechanism for releasing the dog 55 from the head portion 59 of the latch rod 51 comprises a latch reelase rod 61 which extends through the central bore of the stud shaft 31 upon which the mandrel shell 30' is rotatably mounted. The latch release rod 61, as shown in Figs. 11, 24 and 25, is provided with a tapered end portion 62 designed to have camming engagement with the cam edge 63 of the head portion 64 of the latch dog 55. Thus when the latch release rod 61 moves inwardly of the mandrel shell, the tapered end 62 thereof engages the cam edge 63 and lifts the dog 55 against the action of spring 60 in a manner to release the head portion 59 of the latch rod 51. When this occurs, the relatively heavy coil spring 45 pushes the spinning nose 40 outwardly so that the outer conical wall thereof is fully exposed and forms an accurately aligned extension of shell 30. Since the nose 40 accelerates rapidly under the influence of spring 45, damping means are provided by causing head 59 to compress air in the cylindrical recess 48', the physical dimensions of the head and recess being so correlated, that the imprisoned air can escape only comparatively slowly, thereby preventing violent metallic impact.

The release rod 61 is manipulated axially of the mandrel by cam mechanism contained within the hollow hub of the mandrel supporting turret 10. As shown more particularly in Figs. 11 and 16, the release rod 61 of each mandred assembly terminates in a head block 65. A coil compression spring 66 embraces the inner end of the release rod 61 and is compressed between the head block 65 thereof and the threaded boss 32 of the mandrel supporting stub shaft 31. Each head block 65 supports a spindle shaft 67 having a cam roller 68 rotatably journaled on each end thereof. The cam rollers are designed to roll against a pair of similar cam tracks 69, the cam rollers 68 being maintained in rolling engagement with the paired cam tracks 69 by pressure exerted by the compression spring 66.

The cam tracks 69 extend around the circumference of a cam sleeve. The cam sleeve may be formed in two parts comprising a right hand section 70 and a left hand section 70' as shown in Fig. 11. The cam sleeve section 70 and 70' are fixed to a stud shaft 71 as by suitable key elements 72. The complementary cam sleeve sections 70 and 70', when matched together and mounted on the stub shaft 71, define a circumferentially extending groove 73 therebetween of a size to admit and guide a portion of the head blocks 65 therein.

The cam tracks 69 are truly circular over approximately 270° of their peripheral length. The circular part of the paired cam tracks 69 provides a non-moving support for the release rod 61 as the mandrel associated therewith moves from the winding station A through the pressing station B, through the spinning station C and through the stripping station D. The spinning nose 40 is fully projected as the mandrel passes through the winding station A, through the pressing station B, and to the spinning station C. At the spinning station C, the nose core is forced into the mandrel shell 30' by the spinning head 350, until it is automatically latched in retracted position by the latch dog 55. The nose core remains latched in retracted position until the mandrel has passed through the stripping station D.

When the mandrel has passed the stripping station D, release of the spinning nose 40 from its retracted latched position is effected by providing the paired tracks 69 with corresponding riser parts 69' as shown more particularly in Fig. 16. When the paired cam rollers 68 move over the riser parts 69' located intermediate the stripping station D and the winding station A, the release rod 61 is driven inwardly against the action of the compression spring 66 to a point where the tapered end 62 thereof engages the cam edge 63 of the latch dog 55 to release the latch dog from the head portion 59 of the latch rod 51. The heavy coil spring 45 then operates to drive the spinning nose 40 outwardly to its fully extended position as determined by shoulder 59' of rod 51 coming to rest at the bottom of recess 48'.

The radial position of the raised part 69' of the paired cam tracks 69 may be adjusted so that the outwardly projecting movement of the spinning nose 40 is accurately timed with the movement of the mandrel supporting turret as the mandrels are successively advanced by the turret from the stripping station D to the winding station A. This is effected by rotative adjustment of the stub shaft 71 upon which the cam supporting sleeve sections 70 and 70' are fixed. As shown in Fig. 11, a bearing 74 supported on the hub cover plate 14 and a bearing 74' supported on the end wall 12 of the hub shell 11 rotatably support the stub shaft 71 within the hub casing 11. The stub shaft 71 has an extension 71' which extends through the bore of the hollow trunnion 16, and terminates in a rectangular shaped head 75 projecting beyond the cover plate 21 fixed to the bearing block 17. As shown in Figs. 11 and 12, a lock plate 76 is rotatably secured to the cover plate 21 by means of screws 77, each extending through an arcuate slot 78 in the plate 76 and threaded into the bearing cover plate 21. The lock plate 76 is provided with a radial slot 79 designed to snugly receive the rectangular end 75 of the stub shaft extension 71'.

By rotatably adjusting the lock plate 76, the stub shaft 71 may be turned to the extent required to insure accurate location of the riser part 69' of the paired cam tracks 69 between the stripping station D and the winding station A. A suitable sleeve bearing 80 may be mounted over the exterior end of the stub shaft extension 71' to provide a bearing support therefore within the hollow trunnion 16. The sleeve bearing 80 may be removably held in operative position by a clamp plate 81 suitably secured as by screws to the outer end of the hollow trunnion 16.

Thus it will be appreciated that the mandrel turret 10 and its associated trunnions 13 and 16 are mounted to rotate in the bearings 18 and 20 supported by the bearing blocks 17 and 19 respectively. The stub shaft 71 which supports the cam sleeve sections 70 and 70', however, is normally held in fixed position by the lock plate 76. The lock plate 76 may, however, be rotatably adjusted by loosening the holding screws 77 so as to rotate the lock plate 76 and the stub shaft 71 the desired distance so as to place the riser part 69' of the paired cam tracks 69 in position to manipulate the release rods 61 as the associated mandrels move from the stripping station D to the winding station A. Since the position of the riser part 69' of the paired cam tracks 69 is not visible when the turret has been fully assembled, suitable marker lines 82 may be scribed into the edge of the adjustable lock plate 76 and the adjacent edge of the bearing block cover plate 21, so as to visibly indicate when the riser part 69' of the cam tracks 69 has been placed in proper adjusted position for effective turret action.

The turrent drive mechanism

The mandrel supporting turret 10 is rotated quickly by stages so as to bring the successive mandrels into position at the successive operating stations. When the mandrels have been moved to the operating stations, the turret remains stationary for a sufficient time interval to permit completion of the intended body operations as performed at the operating stations, before the turret is again quickly rotated through a partial revolution to progressively advance the successive mandrels to the following operating stations.

This desired intermittent movement of the turret is effected by drive mechanism which includes a Geneva gear 100, as diagrammatically illustrated in Fig. 8 and more particularly illustrated in Figs. 9, 10, 11 and 14. The Geneva gear 100 has a hub portion 101 which is removably held in position by a shaft plate 103 secured to the end of the trunnion shaft 13 as by a screw 104. Where the machine is equipped with four operating stations, the Geneva gear 100 would be provided with four radially extending cam slots 105.

The Geneva gear 100 is driven from a drive shaft 110, as shown in Figs. 9, 10 and 11, one end of which is journaled in a journal block 111 supported upon a bracket 112 fixed to the adjacent framework of the machine, such as the side plate 112' bolted to the adjacent channel frame members 23 and 27. The other end of the drive shaft 110 may be journaled in a suitable journal block 113 fixed to a supporting plate 114 which may be suitably attached to the adjacent framework at the head end of the machine, as for example to the front ends of the channel frame members 28. A sturdy drive sprocket 115 fixed to the shaft 110, as shown in Figs. 9 and 10, supports a drive chain 116 which is connected to a suitable driving unit such as a motor or the like (not shown).

The drive shaft 110 has a drive worm 117 fixed thereto and contained within the bearing block 111 which also serves as a suitable housing for the drive worm 117. The drive worm 117 meshes with a worm gear 118 affixed to a stub shaft 119. The stub shaft 119 may be journaled in suitable journal bearings contained in the gear housing 121, as shown in Fig. 11. The gear housing 121, which encloses the worm gear 118, may be formed as a part of the bearing block housing 111, and the gear housing 121 may be provided with a detachable cover section 121'.

A Geneva driving member 125 is fixed to the stub shaft 119 rotated by the worm gear 118. The driving member 125 is provided with a radially projecting portion 126 to which a stud spindle 127 is secured. The stud spindle 127 supports a cam roller 128 designed to be swung successively into the radial slots 105 of the Geneva gear 100 as the driving member 125 is continuously rotated. It will be appreciated by referring to Figs. 8 and 9, that the cam roller 128 moves into the open end of the Geneva slot to rotate the Geneva gear 100 clockwise through a predetermined arc before the cam roller 128 is disengaged from the Geneva gear. Thus when the continuously rotating driving member 125 has made a complete revolution, the Geneva gear 100 and the mandrel supporting turret 10 has been rotated through an arc which places the successive mandrels mounted thereon at the next succeeding operating stations.

It will further be appreciated, that before and after each partial rotation, the Geneva gear 100 is firmly locked and held in a definite position as the cylindrical skirt 125' of the driving member 125 engages in close contact with one of the conforming arcuate faces 100' of the Geneva gear 100.

Winding mechanism at the winding station

Mechanism is provided at the winding station A to guide and direct the paired bottle forming blanks a and b around the mandrel in a manner to insure a bottle body which is compactly and uniformly wound. This winding mechanism includes a pair of diametrically opposed winding rollers 150 and 150', as shown in Figs. 14 and 15, each rotatably mounted and positively driven in rolling contact with the paper blanks undergoing winding on the mandrel. The paired blanks being wound are further guided and directed onto the mandrel by a pair of upper and lower finger assemblies 190 and 190', as shown in Figs. 16 and 17, which are swung into and out of operative position in synchronized relation to the stage rotation of the mandrel turret 10.

The paired pressure rollers 150 and 150' are similar in construction and arranged on diametrically opposite sides of the winding mandrel 30 when swung into winding position therebetween. As shown more particularly in Figs. 14 and 15, each of the pressure rollers 150 and 150' comprises a cylindrical section 151 operably connected to a slightly tilted truncated conical section 152. The cylindrical section 151 has an inner core 153 encased in a blanket or covering 154 of resilient wear-resistant rubber or the like. The truncated conical section likewise is formed from an inner core 155 covered by a blanket 156 of resilient wear-resistant rubber or the like. A stud shaft 157 is secured to and extends from the end of the cylindrical section 151, and a corresponding stud shaft 158 is secured to and extends from the reduced end of the conical section 152 of each pressure roller.

The cylindrical section of the pressure roller 150 is supported by a vertically extending supporting plate 160 suitably secured in fixed position, as to the adjacent bearing housing 17 and the frame member 25. A bearing 161, fixed in the supporting plate 160, provides a rotatable support for the stud shaft 157. A similar vertical supporting plate 160', secured to the bearing block 19 and frame member 25, is also provided with a bearing 161 which rotatably supports the stud shaft 157 extending from the cylindrical section 151 of pressure roller 150'. It will be noted that the supporting plates 160 and 160' are spaced apart to permit unobstructed orbital movement of the turret supported mandrels therebetween.

The stud shafts 158 extending from the conical ends of the pressure rollers 150 and 150' are rotatably supported in suitable bearings 162 mounted on a front supporting plate 163, as shown in Figs. 13, 15, 16 and 17, the front supporting plate 163 being secured in upright position as to the frame members 28. Thus it will be appreciated that the pressure roller 150 is rotatably supported by the vertical supporting plates 160 and 163 and the pressure roller 150' is rotatably supported on the vertical supporting plates 160' and 163.

As shown more particularly in Figs. 10, 14 and 15, a pair of tie rods 165 may be used to provide further support for the pressure rollers 150 and 150'. One of the tie rods 165 is secured to the rear supporting plate 160 and the front supporting plate 163 to provide support for the pressure roller 150, and the other tie rod 165 is secured to the rear supporting plate 160' and the front supporting plate 163 to provide support for the adjacent pressure roller 150'. Each of these tie rods 165 supports a knuckle block 166 which may be adjustably clamped to the rod 165 by a suitable clamp plate 167. Each knuckle block 166 has a bearing collar 168 associated therewith, the bearing collar 168 providing a pocket for a bearing 169 which is secured as by stud 170 to the core 153 of the cylindrical section 151 of the roller. The other end of the bearing collar 168 provides a pocket for a bearing 171 secured as by stud 172 to the inner core 155 of the conical section 152 of the pressure roller. Thus the adjacent ends of the cylindrical section 151 and the conical section 152 of each pressure roller 150 and 150' are rotatably supported by the bearing collar 168 of the knuckle block 166.

The adjacent bearing supporting studs 170 and 172 may be provided with suitable drive connecting means such as intermeshing gear heads 173, permitting rotation of the cylindrical section 151 and the conical section 152 of each pressure roller as a unit.

Means are provided for continuously rotating the pressure rollers 150 and 150' in the same direction and at the same speed. As shown more particularly in Figs. 10, 14, 15, 16 and 17, a shaft 174 is rotatably supported on the front supporting plate 163 and the rear supporting plate 160 and extends parallel to the pressure roller 150. The shaft 174 has a gear 175 fixed thereto which meshes with a gear 174' fixed to the stud shaft 157 extending from the cylindrical section of the pressure roller 150. The other end of the shaft 174 carries a driving member such as a pulley wheel 176, as shown in Fig. 13, positioned adjacent the front supporting plate 163.

A similar shaft 177, extending parallel to the pressure roller 150', is rotatably mounted on the rear supporting plate 160' and the front supporting plate 163. The shaft 177 supports a gear 178 which meshes with a gear 179 secured to the stud shaft 157 extending from the cylindrical section of the pressure roller 150'. The other end of the shaft 177 projects beyond the front supporting plate 163 and carries a pulley wheel 180. A drive belt 181, trained around the pulley wheels 180 and 176, permits clockwise rotation of the pressure rollers 150 and 150' in unison. A second pulley wheel 182 fixed to the end of shaft 177 supports a drive belt 183 trained around pulley wheel 184 fixed to power drive shaft 110, whereby both pressure rollers 150 and 150' may be driven in unison from the drive shaft 110. Since the pressure rollers 150 and 150' are continuously rotated, the winding mandrel is rotated thereby as soon as it has been swung into winding position therebetween by the mandrel supporting turret.

Mechanism is provided to additionally guide and direct the paired blanks $a$ and $b$ in a positive manner around the winding mandrel during its dwell at the winding station. As shown more particularly in Figs. 9, 10, 14, 16, 17 and 18, an upper finger assembly 190 and a lower finger assembly 190' are provided which are automatically swung into position to embrace the paired blanks and the mandrel on which they are being wound.

The upper finger assembly 190 comprises a series of spaced arms 191 fixed by a clamp block 192 to hollow shaft 193 which extends generally parallel to and slightly above the pressure roller 150. A supporting block 194 fixed to the rear supporting plate 160 has a bored cavity 195 into which one end of the hollow shaft 193 extends. A bearing sleeve 196 set within the enlarged mouth of the bore 195, provides a rotatable support for the hollow shaft 193. An air line 197 is connected to the bore 195 by a suitable coupling 198, so that compressed air may be passed through the hollow shaft 193 for a purpose to be presently described. Gland packing 199 adjacent the bearing sleeve 196 insures the passage of compressed air supplied by air line 197 into the hollow shaft 193.

The other end of the hollow shaft 193 is rotatably supported in a suitable bearing 200 fixed to the front supporting plate 163, the projecting end of the hollow shaft 193 having a drive sprocket 202 secured thereon.

The several arms 191 associated with the finger assembly 190 each carry an arcuate shaped guide finger 205 contoured in conformity to the surface of the mandrel 30 which it is to embrace when in operating position. The leading end 212 of each finger 205 is given an outward flare adjacent the pressure roller 150' so as to positively guide the leading ends of the paper blanks within the inner surface of each arcuate finger 205 and in a manner so that the blanks will snugly hug the mandrel 30 on which they are wound. A connecting block 206 is fixed at one end thereof to the resilient finger 205 and is loosely connected to its associated arm 191 by a pin 207 which is fixed in arm 191 and extends through an elongated slot 208 formed in the block 206. A leaf spring 209 fixed to the arm 191 is designed to resiliently press against the upper end of the block 206, the block 206 having a pin 210 which projects through a slot in the free end of the leaf spring 209. Thus the block 206 and its associated arcuate finger 205 are adjustably supported on associated arm 191 in a manner to permit the arcuate finger 205 to adjustably seat over the mandrel as the paper stock wound thereon may require.

The lower finger assembly 190' likewise comprises a hollow shaft 193' rotatably supported in suitable bearings associated with the rear supporting plate 160' and the front supporting plate 163. The hollow shaft 193' extends generally parallel to and below the pressure roller 150' and supports a plurality of spaced arms 191' clamped to the shaft 210 as by clamp blocks 192'. Each arm 191' supports a resilient arcuate finger 205' shaped to conform to the surface of the mandrel on which the paper stock is being wound. Each arcuate finger 205' is fixed to a block 206', the block 206' being adjustably secured to its arm 191' by a pin 207' extending from the arm 191' into an elongated slot 208' formed in the block 206'. A leaf spring 209' fixed to the arm 191' presses against the end of the block 206', a pin 210' extending from the block 206' through an elongated slot in the resilient leaf spring 209'. This mounting permits the guide fingers 205' to adjustably conform to the paper stock being wound on the mandrel.

A suitably mounted feed plate 215 has an arcuate section 216 positioned directly over the pressure roller 150 so as to provide a downwardly inclined feeding platen for paired container forming blanks, as shown in Figs. 14, 17 and 18. The pressure roller 150 presses the advancing blanks against the outer surface of the mandrel 30. The leading ends 212' of the arcuate guide fingers 205' flare outwardly so as to facilitate the entry of the blank between the guide fingers 205' and the mandrel. Circumferentially extending grooves 213 may be formed in the surface of the pressure roller 150 which receive the flared ends 212' of the arcuate fingers 205'. Similarly, circumferentially extending grooves 213' may be formed in the pressure roller 150' to receive the flared ends 212 of the guide fingers 205.

It will be noted, by referring more particularly to Fig. 18, that the guide fingers 205 and 205', when in operating position, embrace a substantial part of the circumference of the mandrel 30 in a manner to positively guide the paired blanks around the mandrel. The adjacent ends of the guide fingers 205 and 205' present a sufficient gap therebetween to permit the adjacent pressure roller to have pressing contact with the paper stock being wound on the mandrel.

The finger assemblies 190 and 190' are responsively swung into mandrel embracing position as shown in Fig. 18 and so remain only during the interval when the mandrel is in dwelling position at the winding station. When the paired blanks have been fully wound upon the mandrel at the winding station, the mandrel supporting turret rotates through a partial revolution so as to bring the next succeeding mandrel into position at the winding station. To permit this turret movement, both finger assemblies 190 and 190' must be swung into open position as indicated in Figs. 9, 10 and 17. Swinging movement of the finger assemblies 190 and 190' is accomplished by pneumatic mechanism as illustrated more particularly in Fig. 13.

As shown in Figs. 9, 10 and 13, a sprocket 220 is fixed to the projecting end of the hollow shaft 193'. A drive chain 221 is trained around sprocket 220 and sprocket 202 so that both hollow shafts 193 and 193' may be operated in unison. The drive chain 221 may incorporate a tension spring 222 whereby the sprocket chain 221 may be maintained resiliently taut. A pinion 223 caps the end of the hollow shaft 193' and is designed to mesh with a reciprocating rack member 224. By reciprocating the rack member 224 through a predetermined stroke, the finger assemblies 190 and 190' may be swung to and from the positions indicated in Figs. 17 and 18.

The rack member 224 may be mounted on the rear face of the supporting plate 114, as shown in Figs. 9, 10 and 13, which may be fixed to the frame members 28 and 23. The lower end of the rack member 224 is fixed to a rod extension 226 which is guided for reciprocating movement by guide block 227 secured to the rear face of the supporting plate 114.

The rod 226 and its associated rack member 224 may be vertically reciprocated as by suitable pneumatic means. As illustrated in Fig. 13, the rod extension 226 terminates in a piston 228 contained within an air cylinder 229 which is supplied with compressed air from compressed air line 230 connected to the cylinder 229 as by suitable coupling 231. The air cylinder 229 may be secured to the rear face of the supporting plate 114. A collar 232 fixed to the rod extension 226 directly above the air cylinder 229 supports a compression spring 233 whose upper end abuts against the guide block 227. The compression spring 233 serves to resiliently retain the rack member 224 in its depressed position as shown in Fig. 13. When compressed air is admitted into the cylinder 229, the rack member 224 is reciprocated vertically so as to rotate the rack gear 223 and rotate the shafts 193 and 210 and the finger assemblies 190 and 190' respectively from the raised position as shown in Fig. 17, to mandrel embracing position as shown in Fig. 18.

The finger assemblies 190 and 190' are swung from their raised position shown in Fig. 17 to mandrel embracing position as shown in Fig. 18, the moment an unloaded mandrel has been swung by the mandrel supporting turret to the winding station A. The admission of compressed air to the cylinder 229 through the compressed air line 230 is controlled by a control valve 235 which is supplied with air through a branch air line 236 connected to a compressed air supply line 237. The air control valve 235 is suitably mounted on the framework of the machine, as on the front face of plate 114 fixed to frame members 28. The spool 240 of the air valve 235 is normally held in lowered position by a compression spring 241 so that compressed air is blocked from entering the air chamber of the air valve 235 while air line 230 is connected to exhaust port 230' of valve 235 thereby permitting piston 228 of rack cylinder 229 to assume its lowermost position and maintain the rack member 224 in its low position and the finger assemblies 190 and 190' in raised position as shown in Fig. 17.

Means, however, are provided to lift the valve spool 240 upwardly against the action of coil spring 241 so as to permit air to flow through line 230 and into air cylinder 229, so that the piston 228 will drive the rack member 224 upwardly, thereby swinging the finger assemblies 190 and 190' downwardly into mandrel embracing position as shown in Fig. 18. The mechanism for driving the spool 240 of valve 235, comprises a cam member 242 fixed to a continuously rotating shaft 243 supported by bearing blocks 244 fixed to the supporting plate 114. The cam 242 is continuously rotated by a sprocket wheel 245 fixed to the shaft 243 and supporting a drive chain 246 which may be in driving engagement with a continuously rotating sprocket 246' fixed to the shaft 119 on which the Geneva drive member 125 is mounted, as shown in Figs. 9, 10, 11 and 13. A cam roller 247, held in riding contact with the cam 242 by the compression spring 241, is carried on one end of a rocker arm 248 the other end of which is connected to the projecting end of the air valve spool 240. Rocker arm 248 is pivoted midway between roller 247 and valve spool 240 to a fixed portion of the valve 235.

The driving parts are so synchronized that, during rotation of the turret 10, the continuously rotating cam member 242 permits the valve spool 240 to assume its lower position, as urged by the action of its spring 241, so that compressed air flow to the rack cylinder 229 is cut off. However, as soon as the mandrel supporting turret has been rotated through one stage or partial revolution and an unloaded mandrel has been brought to the winding station, cam member 242 forces the air valve spool 240 to be raised against its compression spring 241, admitting air to the air cylinder 229, thereby raising the rack member 224 so as to positively swing the finger assemblies 190 and 190' from raised position shown in Fig. 17 to mandrel embracing position shown in Fig. 18. The rotating cam member 242 forces the air valve spool 240 to remain raised for a time interval sufficient to complete the winding operation at the winding station, whereupon the cam member 242 allows spring 241 to shift the air valve spool 240 downwardly to halt the flow of air to the air cylinder 229 and open the cylinder air line 230 to exhaust port 230'. The rack spring 233 then drives the rack member 224 downwardly and swings the finger assemblies 190 and 190' to raised position shown in Fig. 17. Thus the movement of the finger assemblies 190 and 190' is synchronized by the continuously rotating valve control cam 242 so that the finger assemblies are held in mandrel embracing position for substantially the entire interval that the mandrel is in winding position at the winding station.

Means are provided to dampen the final increment of swinging movement of the finger assemblies 190 and 190' toward the mandrel 30 at the winding station, so that the resilient fingers 205 and 205' will at no time strike the winding mandrel, but leave an increment of space between the inner surfaces of the paper guiding fingers 205 and 205' and the surface of the mandrel to permit the movement of the paired blanks therebetween. This dampening means may comprise a cylinder 250, as shown in Fig. 13, having an air bleeder outlet 251 from which air discharge is controlled by a threaded valve needle 252. The cylinder 250 contains a piston 253 having a stem 254 with an abutment head 255 at the lower end thereof against which the upper end of the rack member 224 may strike. A compression spring 256 embraces the stem 254 and normally maintains the piston head 253 in depressed position.

On the up-stroke of the rack member 224, the upper end of the rack member must push against the abutment head 255 to compress the escaping air in the cylinder 250, thereby slowing down the final increment of up-stroke of the rack member 224 in a manner so that the paper guide fingers 205 and 205' of the finger assemblies 190 and 190' approach their final mandrel embracing position gently and at reduced speed. This dampening mechanism serves to protect the finger assemblies and mandrel from collision damage.

By referring to Fig. 18, it will be noted that the advancing ends of the paired blanks must be directed downwardly to a point where the advancing ends are gripped between the pressure roller 150 and the mandrel 30. Pneumatic means are provided to forcibly press the advancing ends of the paired blanks to a position to be positively gripped between pressure roller 150 and the mandrel 30. As heretofore described, the hollow shaft 193 of the finger assembly 190 is supplied with compressed air by the air line 197. As shown more particularly in Figs. 16, 17 and 18, a series of spaced air nozzle arms 260 are fixed at one end thereof to the hollow shaft 193 of the finger assembly 190. Each air nozzle arm 260 has an air passage 261 in communication with the interior of the hollow shaft 193 and a series of spaced air nozzle outlets 262 communicating with the air passage 261. When the finger assembly 190 has been swung to mandrel embracing position as indicated in phantom lines in Fig. 17, it will be noted that the air outlet nozzles 262 have been moved to a position to direct a series of fine air streams against the upper surface of the paired container forming blanks, so as to positively drive the advancing ends thereof into a position to be gripped between the pressure roller 150 and the mandrel 30.

The flow of compressed air through the compressed air line 197 and thence to the air arms 260 is controlled by a control valve 265 which may be similar in construction to and synchronized with the operation of the control valve 235 previously described. As shown more particularly in Figs. 9, 10 and 13, the air line 197 is connected to the air valve 265, suitably mounted as on the supporting plate 114. Compressed air is supplied to the air valve 265 through a branch line 266 connected to the compressed air supply line 237. Air valve 265 has an air discharge outlet 267 and a valve spool 269 which is normally maintained in lowered position by a compression spring 268. When the air valve spool 269 is in raised position, compressed air flows through the air line 197 to the air arms 260 associated with the finger assembly 190, which air flow occurs when the finger assemblies are in mandrel embracing position. When the air valve spool 260 is depressed by the action of its coil spring 268, no compressed air flows through the air line 197 to the air arms 260.

The upper end of the air valve spool 269 is connected to a rocker arm 270 which supports a cam roller 271 held by compression spring 268 in riding engagement with a continuously rotated cam member 272 fixed to the driven shaft 243 previously described. The cam member 272 has a cam surface of such character as to permit the valve spool 269 to be depressed by the action of spring 268 and cut off the flow of compressed air to the air arms 260 when the finger assembly 190 is in raised position. However, when the finger assembly has been brought to mandrel embracing position, the shaped cam member 272 has rotated to a position to apply a lifting force on valve spool 269 so that in its raised position, compressed air will flow to the air arms 260 during the interval that the finger assembly is in mandrel embracing position. It will be appreciated that the valve spools associated with the air valves 235 and 265 are operated by their respective cams 242 and 272 and compression springs 241 and 268 substantially in unison and in synchronism with the dwell interval and stage movement of the mandrel supporting turret 10. However, valve cam 272 for valve 265 may be so timed, that air flows only for that very short time interval of approximately a fraction of a second, during which the leading edge of the blanks pass under the nozzles 262. As soon as the paper blanks have been gripped between mandrel 30 and pressure roller 150, the air stream is cut off, being no longer necessary.

During normal operation the mandrel being wound dwells at the winding station for a very short interval of approximately one second and less than two seconds in time. During this momentary dwell, the mandrel is continuously rotated by and between the driven pressure rollers 150 and 150'. Compressed air directed by the air arms 260 associated with the finger assembly 190 bends the advancing ends of the paired blanks downwardly so as to be gripped between the pressure roller 150 and the mandrel 30. The guide fingers 205 and 205' of the upper and lower finger assemblies 190 and 190' respectively guide the paired blanks being wound in hugging relationship to the mandrel and insure a smooth and even wind. The paired pressure rollers 150 and 150' also exert pressure against the blanks being wound, insuring a firm adhesive bond between the inner and outer plies thereof. While the blanks are completely wound on the mandrel when the mandrel has been rotated through approximately two complete revolutions, during the interval that the mandrel dwells at the winding station, however, the mandrel may be rotated ten or more revolutions to insure positive adhesive engagement between the paper plies. When the winding operation has been thus completed, the Geneva gear 100 rotates the mandrel quickly through a partial revolution so as to advance the mandrel wound at the winding station A to the pressing station B.

*Pressing mechanism at the pressing station*

The mandrel which has been wound at the winding station A immediately preceding, comes to rest at the pressing station B where the tubular bottle body encased on the mandrel is given a pressure treatment to further insure a firm adhesive bond between the inner and outer plies thereof, and to smooth out the outer surfaces and joints thereof. The pressing treatment performed at the pressing station also accelerates drying of the adhesive so that when the wound and pressed bottle body leaves the pressing station B on its supporting mandrel, the adhesive has permanently bonded the inner and outer plies of the bottle body together into integral union. When the body loaded mandrel has been swung to rest position at the pressing station B, it will be appreciated that an unloaded mandrel has been swinging by its supporting turret from the unloading station D to winding position at the winding station A.

Pressure is exerted on the wound bottle body at the pressure station B by a pair of pressure rollers 300 and 300' which may be generally similar in construction to the pressure rollers 150 and 150' previously described. The pressure rollers 300 and 300', as shown in Figs. 8, 10, 11 and 14, are arranged on diametrically opposite sides of the body supporting mandrel when the mandrel is swung into position therebetween. Each of the pressure rollers 300 and 300' comprises a cylindrical section 301 operably associated with a slightly tilted truncated conical section 302. The cylindrical section 301 has an inner core 303 encased in a blanket 304 of resilient wear resisting rubber or the like. The truncated conical section 302 likewise is formed from an inner core 305 covered by a blanket 306 of resilient wear-resistant rubber or the like. A stud shaft 307 is secured to and extends from the end of each cylindrical section 301, and a corresponding stud shaft 308 is secured and extends from the reduced end of the conical section 302 of each pressure roller.

The cylindrical section 301 of the pressure roller 300' is vertically supported by a horizontally extending supporting plate 310' which may be suitably secured to a frame part of the machine, such as the channel section 25 or the bearing housing 17. A bearing 311 associated with the supporting plate 310' provides a rotatable support for the stud shaft 307 of pressure roller 300'. A similar horizontal supporting plate 310, secured as to the bearing block 19 or the adjacent framing channel section 25, is also provided with a bearing 311 for the stud shaft 307 extending from the cylindrical section 301 of pressure roller 300. It will be noted that the horizontal supporting plates 310 and 310' are spaced apart to permit unobstructed orbital movement of the turret supported mandrel therebetween.

The stud shafts 308 extending from the conical end of the pressure rollers 300 and 300', are each rotatably supported in a suitable bearing block 312 which supports a bearing 313 in which the end of the stud shaft 308 is journaled. The bearing blocks 312 may be secured in fixed position on a support plate 314 carried by a pair of spaced posts 315. One of the posts 315 is secured at the lower end thereof to the horizontal supporting plate 310, and the lower end of the other supporting post 315 is secured to the adjacent supporting plate 310'. Thus the pressure rollers 300 and 300' are rotatably supported at the lower ends thereof by the supporting plates 310 and 310' respectively, and by the support plate 314 at the upper ends thereof.

Each of the posts 315 supports a knuckle block 316 which may be adjustably clamped to the post 315 as by a suitable clamp plate 317. Each knuckle block 316 has a bearing collar 318 associated therewith, the bearing collar 318 providing a pocket for a bearing 319 which is secured as by stud 320 to the core 303 of the cylindrical section 301 of the pressure roller. The other end of the bearing collar 318 provides a pocket for a bearing 321 secured as by stud 322 to the inner core 305 of the conical section 302 of the pressure roller. Thus the adjacent ends of the cylindrical section 301 and the conical section 302 of each pressure roller 300 and 300' are rotatably supported by the bearing collar 318 of the knuckle block 316.

The adjacent bearing studs 320 and 322 of the pressure roller 300 may be provided with a suitable drive connecting means such as intermeshing gear heads 323, permitting rotation of the cylindrical section 301 and the conical section 302 of the pressure roller 300 as a unit. The pressure roller 300 is positively rotated by drive means connected to the exposed end of the stud shaft 307 extending from the cylindrical end thereof. Driven rotation of the pressure roller 300 rotates the body carrying mandrel 30 with which it is in pressure contact. The pressure roller 300' is a free-wheeling roller, and the cylindrical section 301 and the conical section 302 thereof is rotated by the rotation of the rotatably mounted mandrel 30 with which it is in pressure contact. Although not necessary, the pressure roller 300' may be continuously driven by drive mechanism connected to the stud shaft 307 thereof, in which event drive connecting means associated with the studs 320 and 322 thereof would be provided.

Any suitable driving mechanism connecting the stud shaft 307 of pressure roller 300 to a continuously driven part of the machine, may be provided. As shown more particularly in Figs. 8, 10, 13, 14, 17 and 18, this driving connection may comprise a bevel gear 325 fixed to the stud shaft 307 of pressure roller 300, the bevel gear 325 meshing with a companion bevel gear 326 fixed to the end of a short driven shaft 327. The shaft 327 may be rotatably supported as on a suitable bracket 328 mounted on the horizontal supporting plate 310. The shaft 327 has a gear 329, which in turn meshes with a transfer gear 330 rotatably mounted on a stud 331 fixed to the supporting bracket 328. The transfer gear 331 meshes with a second transfer gear 332 rotatably mounted on a stud 333 which may also be mounted on the supporting bracket 328. The second transfer gear 332 meshes with the gear 178 fixed to the driven shaft 177. The gear 178 also meshes with the gear 179 fixed to the stud shaft 157 associated with the pressure roller 150' located at the winding station A as previously described.

Thus it will be appreciated that the pressure roller 300 at the pressing station B may be positively driven through the chain of gears above described from the driven shaft 177 which positively rotates the pressure roller 150' located at the winding station A. The diameters of the connecting gears above described may be such as to rotate the pressure roller 300 at a somewhat greater rotating speed than the pressure roller 150' located at the winding station. The driven shaft 177, which rotates the pressure roller 150' at the winding station and the pressure roller 300 at the pressure station, is continuously rotated when the machine is in operation from the power driven shaft 110.

When the bottle body loaded mandrel arrives at the pressure station B, the continuously driven pressure roller 300 exerts substantial rolling pressure against the bottle body mounted on the mandrel so as to iron the exterior surface thereof, effecting even pressure distribution of the adhesive between th paper plies thereof, and particularly compresses the mid-sectional joint and the vertical joints of the bottle body. Rotation of the mandrel 30 by the pressure roller 300, causes corresponding rotation of the pressure roller 300' with which the bottle body is in pressing contact, so that the free wheeling pressure roller 300' exerts evening and compressive pressure on the bottle body. The body loaded mandrel may be rotated at the pressing station through ten revolutions or more during the dwell interval for which the mandrel supporting turret is geared. When the bottle loaded mandrel is swung from the pressing station B, the quick drying adhesive has been dried as a result of the accelerating drying action of the pressure rollers 300 and 300', so that the plies thereof are permanently adhesively bonded together and will not loosen during or after subsequent operations to be performed on the bottle body.

*Spinning mechanism at the spinning station*

The mandrel supporting turret 10 carries the mandrel supported pressed bottle body from the pressing station B to the spinning station C. The spinning head 350, located at the spinning station C, is continuously rotated and is mounted to move axially into spinning engagement with the mouth end of the bottle body during the dwelling interval of the bottle body at the spinning station.

The spinning head 350 may be located substantially between the frame forming channel sections 25 of the machine. During the spinning operation, the rotatably mounted mandrel should be held against rotation, which may be effected by the provision of a suitable brake device 340 which engages the mandrel body when the bottle body supporting mandrel arrives at the spinning station. As shown in Figs. 10 and 20, this brake device 340 may comprise a rubber cushion 341 fixed to a gripping element 342. The gripping element 342 is adjustably secured to a suitable bracket 343 which may be attached to the adjacent frame forming channel section 25 of the machine. Adjustment of the cushion supporting element 342 may be effected by means of suitable set bolts 344 which extend through elongated slots 345 in the bracket 343 and gripping element 342. By adjusting the extended position of the element 342, the rubber cushion 341 associated therewith may be extended so as to frictionally press against the base end of the body loaded mandrel beyond the bottle body end when the mandrel is swung into spinning position at the spinning station.

As shown more particularly in Figs. 8, 9, 19, 21, 24, 25 and 26, the spinning head 350 comprises a spinning head section 351 having a tubular neck portion 352 which is secured to the threaded end 353 of a rotatably mounted shaft 354. The head section 351 is made from hard wear-resistant metal and may present a circular spinning groove 355 whose cross sectional contour is such as to inwardly curl the mouth end of the bottle body. When the body loaded mandrel arrives at the spinning station C, the spinning nose 40 thereof is fully extended so as to support the reduced conical end of the bottle body, and the spinning head 350 is spaced from the end of the mandrel as indicated in Figs. 19 and 21. The spinning head shaft 354 is constantly rotated during operation of the machine by rotating mechanism to be presently described. Mechanism is also provided, to be presently described, which shifts the spinning head supporting shaft 354 axially and moves the spinning head into engagement with the mouth end of the bottle body.

As the spinning head 350 continues its axial advance, the mouth end of the bottle body is caused to curl inwardly within the forming groove 355 as indicated in Fig. 24. This is facilitated by the fact that the groove 355 has a flared forming surface 355'. As the spinning and axial pressing movement continues, the spinning section 351 of the spinning head causes the free end of the bottle body to curl axially inwardly, which is further facilitated by the surface characteristics of the raised shoulder 356 of the spinning head.

Axial advance of the spinning head causes the end of the bottle body to also curl against the anvil surface of the groove 44 associated with the spinning nose 40 of the mandrel 30. As the spinning head advances, the spinning nose 40 is driven inwardly against the action of the compression spring 45 associated therewith, by the pressure exerted by an abutment head 357 associated with a stud 358 supported by a bearing 359 mounted in the hollow bore 360 of the spinning head, as shown in Figs. 24, 25 and 26. It will be noted that the abutment head 357 associated with the spinning head 350 abuts against the end of the latch rod 51 which is fixed to the spinning nose 40 of the mandrel as by pin 52. The bearing mounted abutment head 357, on contacting the non-rotating end of latch rod 51, thus eliminates friction between rotating and non-rotating parts.

Fig. 24 shows the spinning head 350 after the abutment head 357 thereof has moved into abutment against the end of the latch rod 51 fixed to the spinning nose 40. The abutment head 357 and its associated stud 358 is held against rotation by the non-rotating latch rod 51 against which it frictionally abuts. The groove 355 of the spinning head 350 and the groove 44 associated with the spinning nose 40 together form a cavity of approximately circular cross section which determines the shape of the inwardly curled bead to be formed on the bottle body, and the pressing action of the shaping surfaces of the grooves 355 and 44 insure a compact and tightly wound bead.

The mouth end of the bottle body continues to roll itself into a compactly wound bead as the spinning head progressively advances, and until the bead has been fully formed as shown in Figs. 25 and 26. When this occurs, the abutment shoulder 58 of the latch dog 55 will have dropped into abutting engagement against the rear edge 49' of the head portion 59 of the latch rod, to thereby latch the spinning nose 40 in retracted position, as shown in Fig. 25 and previously described. The shaft 354 upon which the spinning head 350 is secured, then axially shifts to the right, as shown in Fig. 21, moving the spinning head 350 out of contact with the bottle body whose mouth end has been curled into a fully formed bead. The bottle body supporting mandrel at the spinning station C is then free to be swung by its supporting turret 10 to the stripping station D.

The shaft 354 which supports the spinning head is slidably fixed to a rotatable sleeve 365 by a key 366 extending into an axially extending key slot formed in the end extension 354' of the shaft 354, as shown in Fig. 21. It will thus be appreciated that the shaft 354 may axially slide in the sleeve 365 which rotates therewith. The rotatable sleeve 365 is supported in a tubular casing 368 by a set of bearing assemblies 369 contained within the casing 368. The tubular casing 368 is supported by a flanged collar 370 secured thereto as by one or more set screws 371. A sturdy angle shaped bracket 372, having a depending leg 373, is suitably fixed to and between the frame forming channel sections 25. The flanged collar 370 is secured to the depending leg 373 as by suitable securing bolts 373' as shown in Figs. 19 and 21.

The tubular sleeve 365 in which the end extension 354' of the spinning shaft 354 is free to axially slide, has a driving member such as a pulley 374 fixed thereto. A motor 375, as shown in Fig. 19, is supported upon the horizontal leg of the supporting bracket 372 and drives the spinning head shaft 354 by means of a suitable belt 376 trained around the pulley 374. The spinning head 350 is thus continuously rotated by the driving motor 375.

Shifting mechanism is provided to automatically and positively shift the spinning head 350 into and out of engagement with the mouth end of the bottle body supported on the mandrel in dwelling position at the spinning station. This shifting mechanism, as shown more particularly in Figs. 19 and 21 and diagrammatically illustrated in Fig. 8, comprises a tubular bearing block 380 slidably contained within the fixed tubular casing 368. The bearing block 380 has a bore within which the spinning head shaft 354 is free to rotate. A radial thrust bearing 381 rotatably supports the spinning head shaft 354 within the bearing block 380. The thrust bearing 381 is detachably locked in position by a lock plate 382 secured to the bearing block 380 as by suitable screws. It will be appreciated that the bearing block 380 does not rotate, but has an axial movement along with the spinning head shaft 354 which rotates therein.

A pair of diametrically arranged studs 384 have their inner ends secured to and project laterally from the bearing block 380. Each stud 384 also projects through an elongated slot 385 formed in tubular casing 368. The studs 384 provide means for axially shifting the bearing block 380 and the spinning head shaft 354 which rotates therein.

A pair of levers 386 and 386', as shown more particularly in Figs. 9, 19 and 21, is secured on a horizontally extending rocking bar 387 whose ends may be suitably journaled in the spaced frame forming panel sections 25. The upper end of the lever 386 is resiliently secured as by a tension spring 388 to the supporting bracket 372 forming a part of the frame work of the machine. A link 389 is connected to each of the levers 386 and 386' as by a pivot stud 390. The other end of each link 389 is journaled on the adjacent stud 384 extending laterally from the bearing block 380. Thus it will be appreciated that swinging movement of the levers 386 and 386' fulcrumed by the rocking bar 387 on which they are secured, will cause a corresponding axially shifting movement of the bearing block 380 which rotatably supports the spinning head shaft 354 therein.

The lever 386 extends a suitable distance beyond rocking bar 387, as shown more particularly in Figs. 9 and 19, and rotatably supports a cam roller 391. The coil spring 388 connected to the upper end of the lever 386 normally retains the cam roller 391 in rolling contact with the cam surface of a continuously driven cam member 391', which is fixed to a horizontally extending shaft 392 rotatably supported in a pair of brackets 393 which may be suitably secured to the adjacent frame forming channel sections 25. The cam shaft 392 may have a sprocket 394 fixed thereto, as shown more particularly in Figs. 8 and 9. The cam shaft 392 may be continuously driven by a drive chain trained around its drive sprocket 394, such as the drive chain 246. As previously described, the drive chain 246 may be driven from the sprocket 246' fixed to the stud shaft 119 of the Geneva driving member 125.

Thus the continuously rotating cam member 391', as shown in Figs. 9 and 18, serves to transmit a rocking movement to the rocking bar 387 to which the paired levers 386 and 386' are fixed. As shown in Figs. 9, 19 and 21, only the lever 386 carries a cam roller 391 in riding contact with the cam member 391', the lower end of the lever 386' having no cam roller 391 but being nevertheless fixed to the rocking bar 387 so that both levers 386, 386' swing in unison when the rocking bar 387 is rocked through the rotative action of the cam member 391'.

The cam member 391' is so shaped and driven that during the orbital movement of the mandrel supporting turret 10, the spinning head 350 is maintained in the retracted position shown in Figs. 8, 19 and 21. When the bottle loaded mandrel has been swung into dwelling position at the spinning station C, however, continuing rotation of the cam member 391' swings the upper end of the levers 386 to the left as viewed in Figs. 19 and 21, so that the links 389 which connect the levers 386 and 386' to the bearing block 380, will move the bearing block 380 and the spinning head shaft 354 axially, to advance the spinning head 350 into spinning engagement with the mouth end of the bottle body.

When the mouth end of the bottle has been fully shaped into the desired bead formation as shown in Fig. 26, the cam member 391' will have rotated to the point where the tension spring 388 operates to draw the manipulating levers 386 and 386' to the right as viewed in Figs. 9 and 19, thereby retracting the spinning head 350 free of the mandrel and the bottle body supported thereon to the position indicated in Fig. 20. Thus the spinning treatment of the mouth end of the bottle body occurs only when the bottle body supporting mandrel is in dwelling position at the spinning station. During this dwelling interval, the spinning head 350 is manipulated toward and into spinning engagement with the mouth end of the bottle body, and when the spinning treatment has been completed, the spinning head 350 is moved out of engagement with the mouth end of the bottle body an instant prior to the orbital movement of the mandrel from the spinning station towards the unloading or stripping station D.

The spinning groove 355 formed in the head section 351 of the spinning head 350, is contoured to effectively form a bead on the mouth end of the bottle as the spinning head is rotated at relatively high speed. The forming surface of the spinning groove 355 should be highly polished and formed of hard metal so as to avoid serious frictional heating of the mouth end of the bottle body during the spinning action. In event the paper stock or adhesive is of such a nature as to be deterioratingly effected by the frictional heat generated by the spinning action, the spinning head 350 may be provided with a pair of diametrically mounted curling rollers 395, as illustrated in Figs. 22 and 23. The curling rollers 395 may be rotatively mounted on suitable spindle pins 396 set into the head section 351 of the spinning head. The curling rollers 395 have a concaved anvil surface 397 defined between an outer raised rim 398 and a slightly raised inner rim 399. When the spinning head 350, as illustrated in Figs. 22 and 23, is in spinning engagement with the mouth end of the bottle body, it will be appreciated that only the curling rollers 395 engage the paper stock to curl and roll the same into the desired bead formation. Since the curling rollers 395 have rolling engagement with the mouth end of the bottle body, frictional heating of the paper stock is substantially avoided.

*Stripping mechanism at the stripping station*

Upon completion of the bead formation at the mouth end of the bottle body at the spinning station C, the mandrel supporting turret 10 orbitally transports the bottle supporting mandrel to the stripping station D, at which station the body supporting mandrel is desirably in inverted position so as to permit downward stripping removal of the bottle body therefrom during the interval of dwell of the mandrel at this station.

The stripping operation is performed by a pair of stripping dogs 400 between which the body supporting mandrel is orbitally advanced. Each stripping dog 400, as pictorially illustrated in Fig. 32, may be formed as a relatively heavy casting to present a main body section 401 having a pair of spaced lugs 402 projecting upwardly therefrom. The inside face of the body section 401 presents an arcuate surface 403 which substantially conforms to the surface of the cylindrical body section of the mandrel 30. The arcuate surface 403 terminates in an arcuate edge 404 designed to engage the butt end of the bottle body as wound on its supporting mandrel.

Below the arcuate edge 404 a pair of depending grippers 403' are disposed. The inner arcuate surfaces of the grippers 403' have a radius which is slightly greater than the radius of surface 403, and slightly less than the radius of the outside diameter of the cylindrical portion of the bottle body. The grippers 403' are separated from each other a sufficient distance to permit spanning of a guide rod 410 when the stripping dog 400 is rocked to its non-stripping position, as shown in Fig. 11. When the stripping dogs are rocked into operative engagement with the bottle body, the grippers 403' on each of the dogs 400 grip opposite sides of the cylindrical section of the bottle body just below the free edge thereof, thus serving to accurately support and guide the bottle body in its downward stripping motion after it has left the cylindrical portion of the mandrel 30 and until it is firmly seated in a receiving cell. The receiving cell is incorporated in another part of a machine which performs subsequent operations upon the bottle body, and is disclosed in copending application Serial No. 85,782, filed April 6, 1949. The paired stripping dogs 400 are designed to reciprocate in a manner to forcibly drive the bottle body axially from its hugging position on the mandrel, and to guide and deliver the bottle body axially from the conical end thereof in seated position within a receiving cell.

The stripping dogs 400 are guided in their reciprocating movement by a pair of guide rods 410. The upper end of each guide rod 410 extends through an abutment plate 411, one of the abutment plates being suitably secured as to the trunnion block 17, and the other abutment plate 411 being secured as to the trunnion block 19. The lower end of each of the guide rods 410 is secured to a laterally extending plate 412 fixed to the lower end of a vertically extending tie plate 413 which may be bolted as by bolts 414 to the adjacent channel shaped frame member 28, as illustrated in Figs. 11, 29 and 30.

Each stripping dog 400 is swingably suspended from a guide block 415 having a bore through which the adjacent guide rod 410 extends, thereby guiding the block 415 in its reciprocating movement. Each guide block 415 is connected to the inner run of a continuous chain 416 as by a pin 417. The upper end of each chain 416 is trained over a sprocket 418 rotatably mounted on a collared stud fixed to the upper end of the adjacent tie plate 413. The lower end of each continuous chain 416 is trained over a sprocket 420 fixed to a horizontally extending shaft 421 suitably journaled as in the lower ends of the tie plates 413. When the shaft 421 is rotated, the inner run of the chain 416 to which the guide block 415 is attached, draws the guide block 415 upwardly or downwardly in accordance with the direction of travel of the inner run of the chain. Mechanism is provided for rotating the chain shaft 421 clockwise and counterclockwise as will presently appear.

Each guide block 415 presents a relatively flat and smooth rear surface 425 which slides along the inner face of the adjacent vertically extending tie plate 413 in a manner to insure smooth reciprocating travel of the guide block 415 and prevent angular rotation thereof. Each guide block 415 presents a projecting section 426 which extends between the spaced lugs 402 of the stripping dog 400. A hinge pin 427 extends axially through a horizontal bore in the projecting section 426 of the guide block 415 in a manner so that the pin 427 is free to rotate therein. The paired projecting lugs 402 of stripping dog 400 axially receive the projecting ends of the hinge pin 427 and may be secured to the hinge pin as by pins 428. Thus it will be appreciated that each stripping dog 400 is swingably suspended by the pivot pin 427 from the projecting section 426 of its associated guide block 415 and designed to vertically reciprocate therewith.

During the stripping action, the bottle body engaging edges 404 of the paired locking dogs extend around a substantial part of the circumference of the cylindrical section of the mandrel, and are designed to seat against the base edge of the bottle body as shown more particularly in Fig. 29. It is, however, important that neither the arcuate surface 403 nor the bottle body engaging edge 404 of the stripping dog contact the highly polished cylindrical surface of the mandrel in a manner to scratch or mar the same and thus make it more difficult to strip subsequent bottle bodies therefrom.

Each stripping dog 400 is accordingly provided with a pair of freely rotating contact rollers 405 which are secured in an angular position as by stud pins 406 to each lower inside corner of the body section 401 of the stripping dog, as shown more particularly in Figs. 30, 31 and 32. The contact rollers 405 are designed to roll against the cylindrical surface of the mandrel 30 at a point directly above the body engaging edge 404 of the stripping dog. The paired rollers 405 associated with each stripping dog are so mounted and sized as to insure a minute clearance between the arcuate surface 403 of the stripping dog and the mandrel sufficient to avoid scratching contact with the mandrel, but at the same time insure engagement of the stripping edge 404 of the dog with the base edge of the bottle body.

To prevent stripping dogs 400 from rocking further inwardly towards the conical portion of the mandrel 30, after the dogs have moved downward in their stripping stroke to the starting point of the conical portion of the mandrel, a pin 402' is provided which projects from the inner face of one of the lugs 402. Pin 402' is so positioned that it will engage a ledge 426' on projecting section 426 of guide block 415, and prevent further inward swing of dogs 400 after rollers 405 leave the cylindrical portion of the mandrel during the downward stripping stroke. Thus the pins 402' not only prevent undesirable inward rocking of the stripper dogs 400 when they are out of control of the cylindrical portion of the mandrel if the mandrel does not carry a bottle body, but also prevent excessive pressure of the gripper members 403' of dogs 400 upon the bottle body as the latter moves off the mandrel during stripping. The light gripping pressure of grippers 403' thus attained also permits easy sliding release of the bottle body from the mandrel, after the bottle body has been seated into the receiving cell therebelow.

The contact rollers 405 of each stripping dog are resiliently maintained in rolling contact with the cylindrical section of the mandrel by a wound spring 430 which is supported by a pin 431 projecting from one side of the guide block 415 on which the stripping dog is swingably mounted. One free end of the spring 430 is designed to seat against an abutment 432 of the guide block, and the other end against the projecting lug 402 of the stripping dog. Thus the wound spring 430 serves to normally urge the paired contact rollers 405 of each stripping dog toward rolling engagement with the adjacent cylindrical face of the mandrel from which the bottle body is to be stripped.

Orbital travel of the mandrels as supported upon the rotatable mandrel turret 10, requires unobstructed movement of the mandrel between the stripping dogs 400 at the stripping station. The stripping dogs 400 must accordingly be swung clear of the path of travel of the mandrel as it moves to and from its dwelling position at the stripping station. Immediately prior to the orbital movement of the mandrel to and from the stripping station, each guide block 415 and its suspended stripping dog 400 has been moved by its associated reciprocating chain 416 to the upper end of its guide rod 410, as shown more particularly in Fig. 11. As also shown in Figs. 31 and 32, an abutment roller 407 is rotatably mounted in a suitable recess 408 formed in the extreme upper end of one of the suspension lugs 402 associated with the stripping dog. The roller 407 projects partially above the upper end of its associated supporting lug 402 in a manner so as to strike the plate 411 positioned at the upper end of the guide rod 410.

The final increment of up-travel of the stripping dog 400 presses the abutment roller 407 thereof against the adjacent stop plate 411 in a manner to swing outwardly the lower end of the stripping dog 400 entirely away from the path of travel of the mandrel, as illustrated in Fig. 11, with the rear groove 409 of the dog spanning the adjacent guide post 410. The paired stripping dogs 400 are maintained in their outswung position during movement of the mandrel from the stripping station C and to the winding station A. After the mandrel to be stripped arrives at the stripping station, the dog supporting run of the manipulating chain 416 moves in a downward direction, carrying the abutment roller 407 away from the abutment plate 411 and thereby permits the wound spring 430 to responsively swing the contact rollers 405 into rolling contact with the mandrel body.

It will be noted that the bottle body is wound on the mandrel in a manner to leave a substantial base section of the mandrel exposed, as shown in Fig. 14, so that when the stripping dogs 400 are in their uppermost position, the stripping edges 404 thereof are positioned above the base edge of the bottle body. Thus when the stripping dogs 400 move away from the abutment plates 411, the stripping edges 404 thereof swing inwardly and move into engagement with the base edge of the bottle body. Since the bottle body is necessarily tightly wound on the mandrel, the stripping dogs 400 and associated manipulating mechanism should be sturdily built to exert such force as may be required to effectively strip the cylindrical part of the bottle body from the cylindrical section of the mandrel. The bottle body is fully supported and axially guided for the full stroke necessary to seat the bottle body in the receiving cell. The stripping dogs 400 therefore have a reciprocating stroke which is somewhat greater than the length of the mandrel which the bottle body originally occupied.

Stroking action of the stripping dogs 400 is effected by driving mechanism connected to the shaft 421 whose sprockets 420 support the lower ends of the manipulating chains 416. The chain driving shaft 421 has a pinion 435 fixed to the projecting end thereof, as shown more particularly in Figs. 14, 28 and 29. A rack member 436 is mounted in driving engagement with the pinion 435.

An air cylinder 440 contains a piston 441 having a piston rod 442. The end of the piston rod 442, which projects through a packing gland 443 in the end wall of the cylinder 440, is secured to the end of the rack member 436. Bosses 444 on piston 441, traveling between each end of cylinder bore 440' as shown more particularly in Fig. 28, serve to define the stroke of the rack member 436. The air cylinder 440 may be conveniently supported from the adjacent framing member 28 of the machine as by a suitable bracket 445.

The head end of the air cylinder 440 has a suitable coupling 446 connected thereto, which is in turn connected to a compressed air supply line 447 having an air throttle valve 448 through which compressed air is metered to and from the air cylinder 440. The compressed air supply line 447 is also connected to a control valve 450 as shown more particularly in Figs. 13 and 28. Compressed air is admitted by the control valve 450 to the air cylinder 440 in timed synchronism with the dwell interval of the mandrel turret 19, and only when a body loaded mandrel has reached its dwelling position at the stripping station D, in which position the stripping dogs 400 are in their maximum raised position.

Compressed air entering the air cylinder 440 through the air supply line 447 drives the piston head 441 in a manner to rotate pinion 435 counterclockwise as shown in Fig. 28. Counterclockwise rotation of pinion 435, rotates the chain manipulating shaft 421 in the direction to cause downward travel of the stripping dogs 400 in a quick downward stroke sufficient to completely strip the bottle body from the mandrel. Thereupon, the control valve 450 operates to shut off the flow of compressed air through air supply line 447 and to the air cylinder 440. The rack member 436 is then impelled to make its return stroke by a relatively heavy tension spring 449 having one end thereof secured as to the stationary air cylinder 440 and the other end thereof secured to a pin 449' projecting from the rack member 436. The heavy tension spring 449 is stretched when air pressure on the piston head 441 drives the rack member 436 to the left as shown in Fig. 28. However, when the air supply to the air cylinder 440 is cut off by the action of the control valve 450, and the line 447 thereby opened to atmosphere through valve 450, the stretched tension spring 449 has the ability to draw the rack member 436 toward the air cylinder 440, moving the piston head 441 to the right, as shown in Fig. 28, and expelling the air from the head end in the air cylinder through the line 447 and control valve 450.

The control valve 450, as shown more particularly in Figs. 13 and 28, may be mounted upon the supporting plate 114 in a convenient position. The control valve 450 is supplied with compressed air by the compressed air supply line 452, which branches from the main air supply line 237 previously described. The valve spool 453 is retained by compression spring 454 in a position to normally block the flow of compressed air through the supply line 447 and to the air cylinder 440. The valve spool 453, however, is also connected to a lever 455 pivotally mounted on a suitable bracket 456 extending from the body of the valve. The lever 455 supports a cam roller 457 pressed into rolling engagement with the cam surface of a cam member 458 by spring 454. The cam member 458 may be fixed to the shaft 243 to which valve operating cam members 242 and 272, previously described, are also secured.

The cam shaft 243 is continuously rotated by its driving sprocket 245 to continuously rotate the cam member 458 which operates the control valve 450. The camming track of the cam member 458 is so shaped as to maintain the control valve 450 closed to air supply, with the air supply to the air cylinder 440 thus cut off, during orbital travel of the mandrel supporting turret. The moment, however, that the body loaded mandrel has reached dwelling position at the stripping station, the high spot 458' on cam member 458 has rotated to a position where it rocks the valve lever 455 to manipulate the valve piston 453 to the point where compressed air is admitted into the air cylinder 440 through line 447 to responsively move the stripping dogs 440 in a vigorous body stripping down-stroke.

Upon completion of the down-stroke movement of the stripping dogs 440, the cam member 458 has again rotated to a position where the valve spring 454 may return the piston 453 to cut off the air flow to the air cylinder 440 and open it to exhaust through valve 450, permitting the heavy tension spring 449 to retract the rack member 436 in a manner to upstroke the stripping dogs 400 into pressing position against the abutment plates 411, as shown in Figs. 11, 14 and 28, in which position the stripping dogs are held with sufficient pressure to maintain the body sections 401 of the dogs outwardly swung, free of the path of orbital travel of the mandrel.

Thus the stripping dogs 400 are manipulated in timed relation to the dwelling interval of the mandrel supporting turret, and perform their stripping work only when a body loaded mandrel is in dwelling position at the stripping station. The stripping dogs are so mounted and manipulated as to complete a full down-stroke and upstroke while the mandrel remains stationary at the stripping station during the dwell interval for which the mandrel supporting turret is geared.

*Operation of the machine*

The machine as disclosed in this application is driven by a power unit connected as by chain 116 and sprocket 115 to the main drive shaft 110. The drive shaft 110 continuously rotates the Geneva driving member 125. Assuming, for example, that thirty complete bottle bodies per minute are to be formed on this machine, the Geneva driving member 125 would be driven to make one complete revolution in two seconds.

In the machine as shown in Figs. 8 and 9, the Geneva actuating roller 128 of the drive member 125 is in driving engagement with the Geneva gear 100 for one quarter of its revolution, and the associated mandrel supporting turret 10 is thus rotated one quarter of a revolution in one-half second, which would then be the advance interval of the mandrel supporting turret. The mandrel supporting turret remains fixed and stationary, with its respective mandrels in dwelling position at the successive operating stations, during three-quarters of the revolution of the mandrel driving member 125, and accordingly, the dwelling interval of the machine as shown in Figs. 8 and 9 would be three times the advance interval.

When the cam roller 128 of the Geneva driving member 125 has moved out of driving engagement with the Geneva cam groove 105, the circular periphery 125' of the driving member 125 has sliding contact with the adjacent arcuate face 100' of the Geneva gear 100, and thereby holds the mandrel supporting turret 10 in fixed position during the dwelling interval. The Geneva gear 100 is secured to the turret trunnion 13 in a manner to insure accurate dwelling position of the mandrels carried by the turret at each of the respective operating stations.

The pressure rollers 150 and 150' at the winding station A are continuously rotated from the driving pulley 184 attached to the continuously driven power shaft 110. Thus when a mandrel has been orbitally advanced to winding position by rotation of the turret, the mandrel at the winding station is immediately rotated by the rotating pressure rollers 150 and 150' with which they are in rolling contact. The moment the mandrel arrives at the winding station, feed mechanism, as shown in our copending application, advances the leading ends of the paired blanks to the rotating mandrel 30 at the winding station, and the finger assemblies 190 and 190' swing from their inoperative position shown in Fig. 17 to locate the guide fingers 205 and 205' thereof in mandrel embracing position as shown in Fig. 18.

The continuously driven cam 242 (Figure 13) is shaped to manipulate the spool 240 of the air control valve 235 in a manner to admit compressed air through air line 230 to the air cylinder 229, thereby driving the rack 224 upwardly in a manner to swing the finger assemblies 190 and 190' into mandrel embracing position, which movement occurs the moment the mandrel has arrived in dwelling position at the winding station. Since the cam shaft 243 is continuously rotated from the main drive shaft 110 through the drive worm 117, worm gear 118, stub shaft 119, sprocket 246', sprocket chain 246 and sprocket 245 attached to the cam shaft 243, accurately timed manipulation of the finger assemblies 190 and 190' can readily be attained by orienting the valve operating cam member 242 in proper position on its continuously rotated shaft 243.

The instant that the mandrel has assumed its dwelling position at the winding station and the finger assemblies 190 and 190' have swung into mandrel embracing position, compressed air is projected through the air nozzles 262 of the spaced air arms 260 so as to pneumatically press the advancing ends of the paired blanks into gripping engagement between the rotating pressure roller 150 and the rotated mandrel. Since the air arms 260 are fixedly attached to the hollow rotatable shaft 193 of the finger assembly 190, the air arms 260 are swung into operating position along with the downward swinging movement of the finger assembly 190.

The moment the finger assembly 190 and the associated air arms 260 have been swung into operating position, the continuously rotating cam member 272 fixed to rotating shaft 243 has rotated to a position which operates the compressed air control valve 265, causing compressed air to flow through air line 197 into the hollow shaft 193 of the finger assembly 190 and out through the air nozzles 262 of the air arms 260. The cam member 272 is adjustably secured to the drive shaft 243 to time the flow of compressed air to the air arms 260 only during the first fraction of the time period the air arms remain in operating position.

Cam members 242 and 272 rotate at the same angular speed as the Geneva driving member 125, and their cam surfaces are shaped and oriented in a manner to operate their respective compressed air control valves 235 and 265 in proper timed relation to the dwell interval of the machine. Thus, assuming thirty bottle bodies per minute are to be produced, the cam surface of the cam member 242 is so shaped and oriented as to manipulate the piston 240 of the control valve 235 and admit compressed air to the air cylinder 229 of the rack member 224, and thereby swing the finger assemblies 190 and 190' into mandrel embracing position, and maintain the finger assemblies in mandrel embracing position, somewhat short of the one and one-half seconds of dwelling time during which the mandrel 30 remains at the winding station. Just prior to the termination of the dwell interval of one and one-half seconds, the cam member 242 has rotated to the point where the compression spring 241 moves the piston 240 of control valve 235 to shut off further flow of compressed air to cylinder 229, whereupon the compression spring 233 responsively drives the rack member 224 downwardly to swing the finger assemblies 190 and 190' away from the mandrel 30. Instantly thereafter, the Geneva driving member 125 engages the Geneva gear 100 to rotate the mandrel supporting turret 10 through a quarter revolution, bringing the following mandrel to dwelling position at the winding station A.

Thus it will be appreciated that the finger assemblies 190 and 190', and the air arms 260 associated with the finger assembly 190, remain in inoperative position during each stage of advance of the mandrel supporting turret. Through the action of the rotating valve control cam 242, the finger assemblies 190 and 190' are swung into and held in mandrel embracing position during substantially the entire dwelling interval of the mandrel at the winding station, the finger assemblies 190 and 190' being returned to inoperative position an instant prior to termination of the dwell interval by the compression spring 233, which in turn is permitted to act when the cam member 242 has rotated to a position to permit the valve piston 240 to shut off the compressed air supply to the air cylinder 229.

The wound body supporting mandrel is advanced during the second advance interval by the quarter rotation of the mandrel supporting turret, thereby placing the body supporting mandrel at the pressing station B (Figures 8 and 11). The pressing rollers 300 and 300' at the pressing station exert compressive pressure on the wound body supported on the mandrel in dwelling position therebetween. During this dwelling interval, which may be approximately one and one-half seconds as above indicated, the mandrel supported bottle body is subjected to the rolling pressure of the pressure rollers 300 and 300', thereby smoothing the surfaces of the bottle body, compressing the joints thereof, and insuring a firm adhesive bond between the plies thereof.

During the third rotative stage of the mandrel supporting turret 10, the throttle body is swung along with the mandrel which it encases, to the spinning station C (Figures 8 and 19) where the mandrel and its supported bottle body remain for the full dwell interval, which may be one and one-half seconds as above indicated. The spinning head 350 at the spinning station C is continuously driven by the driving motor 375. The spinning head 350 remains retracted from the orbital path of travel of the mandrels during each advance stage thereof. The moment the mandrel 30 has assumed dwelling position at the spinning station, it is held against rotation by frictional contact with resilient brake block 341 (Figure 20), and the spinning head 350 is axially advanced into spinning engagement with the mouth end of the bottle body.

The spinning head 350 is axially advanced by the action of the continuously rotated cam member 391' fixed to shaft 392 which is continuously rotated at the same angular speed as the Geneva driving member 125, by sprocket chain 246 trained around sprocket 246' fixed to the stub shaft 119 of the Geneva driving member 125, which is in turn driven by main drive shaft 116. The cam member 391' is so shaped as to progressively swing the lever arms 386 and 386', as shown in Figures 19 and 21, in a manner to advance the rotating spinning head 350 in progressive spinning engagement with the mouth end of the bottle body during the dwelling interval of the bottle body at the spinning station.

The spinning treatment of the mouth end of the bottle body also pushes the spinning nose 40 of the mandrel 30 into latched position within the mandrel shell 30'. The mouth spinning operation of the bottle body, as shown in Fig. 26, is completed an instant prior to the termination of the dwelling interval of the bottle body supporting mandrel at the spinning station. Assuming that the machine is timed to provide a dwell interval of one and one-half seconds, the mouth spinning operation is completed in slightly less than one and one-half seconds. The cam member 391' is then driven to make a complete revolution in approximately two seconds. An instant prior to the termination of the dwelling interval, cam member 391' has rotated to a position where the tension spring 388 may operate to manipulate the levers 386 and 386' with which it is associated, thereby to instantly retract the spinning head 350 from spinning position and clear of the orbital movement of the mandrel.

During the fourth quarter revolution of the mandrel supporting turret, the mandrel supporting the mouth spun body at the spinning station C, is swung into dwelling position at the stripping station D (Figures 8 and 28). During this advance movement, the stripping dogs 400 are in their raised inoperative position as shown in Fig. 11, and so maintained by tension spring 449, with their abutment rollers 407 pressed against the abutment plates 411, thereby to maintain the stripping dogs 400 outwardly swung, clear of the advance path of the mandrel.

The moment the body loaded mandrel reaches dwelling position at the stripping station D, the continuously rotating cam member 458 fixed to the rotating shaft 243, has rotated to a position to manipulate the spool 453 of the air control valve 450, causing compressed air to flow through air line 447, thereby driving the piston 441 of air cylinder 440 to the left as shown in Fig. 28, causing rotation of the rack pinion 435 in a manner to give the stripping dog supporting runs of the manipulating chains 416 a vigorous downward stroke. As the stripping dogs 400 move downwardly free of the abutment plates 411, the wound springs 430 associated with the guide blocks 415 swing the stripping edges 404 of the stripping dogs inwardly, and resiliently maintain the contact rollers 405 thereof in downward rolling contact with the cylindrical section of the mandrel. During their quick downward travel, the stripping edges 404 of the stripping dogs exert pushing pressure at the base end of the bottle body so as to forcibly push the bottle body from the mandrel.

The downward body removing stroke of the stripping dogs 400 is accomplished in substantially less time than the full dwelling interval of the mandrel at the stripping station. Assuming, as above indicated, that the dwell interval of the machine is one and one-half seconds, the actual stripping operation may be performed in approximately one second or less. During the remainder of the dwell interval, the cam member 458 is rotated to a position where the compression spring 454 associated with the control valve 450 is free to operate the valve spool 453, thereby cutting off the flow of compressed air through air line 447 to the actuating cylinder 440, whereupon the stretched tension spring 449 associated with the rack member 436 energetically draws the rack member to the right as shown in Fig. 28, returning the stripping dogs 400 to the position of rest against the abutment plates 411, in which position the stripping dogs 400 are clear of the path of advance of the mandrel.

Assuming the machine has a total of four radially spaced operating stations and a turret carrying four radially spaced mandrels, as indicated in the drawings for purposes of illustration only, it will be appreciated that a total of four complete bottle bodies will have been made during each full production rotation of the mandrel supporting turret. By duplicating the number of operating stations and the corresponding number of mandrels on the mandrel supporting turret, production output can be substantially doubled.

Since no bottle body forming function is accomplished during the stage advance of the mandrel supporting turret, stage rotation of the mandrel supporting turret is effected rapidly in minimum time, so as to increase the interval of dwell of the mandrels at the respective body forming stations. Since the interval required to effect complete and uniform winding of the paired blanks on the mandrel at the winding station, largely determines the dwell interval for the machine, high production speeds from this machine are attained through pneumatic operation of the finger assemblies 190 and 190', and the blank guiding advantages of the air arms 260.

This machine is admirably adapted for the manufacture of difficult bottle bodies formed from a rectangular blank paired with an arcuate blank, wound together to provide a bottle body having a cylindrical body part and a truncated conical neck part of plural ply paper material, with the mouth thereof rolled into a compressed inturned bead. It will be obvious to those skilled in the art, that a machine constructed in accordance with this invention, may be made to produce container bodies from a single blank of paper material, container bodies of generaly cylindrical form, and container bodies of generally truncated conical form. It will thus be appreciated that machines may be constructed in accordance with the teachings of this invention to make and form paper container bodies of various shapes and forms from one or more blanks of selected paper material.

This improved machine is compactly designed to occupy minimum floor space, with the various parts thereof readily accessible for adjustment and repair. This improved machine may be constructed at a cost which will permit use thereof by product processors and manufacturers, permitting containers to be constructed at the premises, ready to receive the product contents. The containers can thus be manufactured and made by the product processor or manufacturer as conveniently needed for packaging purposes, thereby most effectively serving his production needs, and effecting substantial savings in transportation and storage of empty bulk containers as otherwise supplied.

While certain novel features of the invention have been disclosed herein, and are pointed out in the claims, it will be understood that various omissions, substitutions, modifications and changes may be made by those skilled in the art without departing from the spirit of the invention.

What is claimed is:

1. A container body forming machine including in combination, a mandrel supporting conveyor, a series of forming mandrels mounted in spaced relationship on said conveyor, a plurality of operating stations arranged along the path of travel of said mandrel supporting conveyor, said operating stations being spaced in accordance with the spacing of said mandrels on said conveyor and including successively arranged winding, pressing, spinning and stripping stations, mechanism at said winding station operative to guide and direct a pair of body forming blanks in winding position on the mandrel during its residence at said winding station, mechanism at said pressing station for exerting ironing pressure on the wound body supported by the mandrel during its residence at said pressing station, mechanism at said spinning station operative to form a rolled bead in the end of the wound body as supported by a mandrel during its residence at said spinning station, mechanism at said stripping station for stripping the wound body from a mandrel during its residence at said stripping station, and conveyor driving mechanism operative to move said mandrels in stage-by-stage advance from and to residence position at said successive operating stations.

2. A container body forming machine including in combination, a rotatably mounted turret having a radially extending body supporting mandrel, a winding station, a spinning station and a stripping station arranged in spaced relationship along the orbital path of travel of said mandrel as defined by the rotation of said turret, drive mechanism associated with said turret operative to effect stage-by-stage advance of the mandrel supported thereon from and to residence position at said successive operating stations, said drive mechanism including means for retaining the mandrel in dwelling position at each of said operating stations for a predetermined dwell interval, devices at said winding station operating in synchronism with said turret driving mechanism for guiding a body blank into winding position on the mandrel during its residence at the winding station, devices at the spinning station operating in synchronism with said turret driving mechanism for forming a rolled bead on the wound body supported on the mandrel during its residence at said spinning station, and devices at said stripping station operating in synchronism with said turret driving mechanism for stripping the wound body from the mandrel during its residence at said stripping station.

3. A container body forming machine including in combination, a rotatably mounted turret having a series of spaced body supporting mandrels arranged in radial spaced relationship, a winding station, a pressing station, a spinning station and a stripping station arranged in spaced relationship along the orbital path of travel of said mandrels as defined by the rotation of said turret, drive mechanism associated with said turret operative to effect stage-by-stage advance of the successive mandrels supported thereon from and to residence position at said successive operating stations, said drive mechanism including means for retaining the mandrels in dwelling position at successive operating stations for a predetermined dwell interval, devices at said winding station or guiding paired body forming blanks into winding position on the mandrel in residence at the winding station, devices at said pressing station for pressing the wound body as supported by the mandrel in residence at said pressing station, devices at said spinning station for forming a rolled bead on the wound body supported by the mandrel in residence at said spinning station, devices at said stripping station for stripping the wound body from the mandrel in residence at said stripping station, and means operating in synchronism with said turret driving mechanism operative to manipulate said blank guiding devices, spinning devices and stripping devices during said predetermined dwell interval.

4. A container body forming machine including in combination, a rotatably mounted turret having a hollow hub section, a body supporting mandrel mounted on and extending radially from the hub section of said turret, said mandrel including a mandrel shell having an axially extending bore, a spinning nose axially movable in the bore of the mandrel shell, a cam member mounted within said hollow hub section, and means extending from said cam member into the bore of said mandrel shell for manipulating said spinning hose in accordance with the rotative movement of said turret.

5. A container body forming machine including in combination, a rotatably mounted turret having a hollow hub section and a hollow trunnion extending therefrom, a body supporting mandrel mounted on and extending radially from the hub section of said turret, said mandrel including a mandrel shell having an axially extending bore, a spinning nose slidably mounted in the bore of the mandrel shell, a normally stationary shaft extending through said hollow trunnion and into said hollow hub, means for rotatably supporting said shaft, a cam member in said hollow hub section fixed to said shaft, means extending from said cam member into the bore of said mandrel shell for manipulating said spinning nose in accordance with the rotative movement of said turret, and means associated with the trunnion projecting end of said shaft whereby said shaft and associated cam member may be adjustably oriented to the desired spinning nose manipulating position.

6. A container body forming machine including in combination, a rotatably mounted turret having a hollow hub section, a series of spaced body supporting mandrels mounted in radial spaced relationship on the hub section of said turret, each of said mandrels including a mandrel shell having an axially extending bore therein, a spinning nose slidably mounted in the bore of each mandrel shell, a cam member adjustably mounted in said hollow hub section, and mechanism extending from said cam member into each of said mandrel shells for manipulating the spinning nose thereof as said turret is rotated through a predetermined arc.

7. A container body forming machine including in combination, a rotatably mounted turret having a hollow hub section, a body supporting mandrel mounted on and extending radially from the hub section of said turret, said mandrel including a mandrel shell having an axially extending bore therein, a spinning nose slidably mounted in the bore of the mandrel shell, means for releasably maintaining said spinning nose in projecting from the free end of said mandrel shell, a latching device within the mandrel shell for releasably mantaining said spinning nose in retracted position, a latch release device in said mandrel shell extending into said hollow hub section, and means in said hollow hub section for manipulating said latch release device to release the spinning nose from its retracted position when the mandrel is advanced by the rotation of said turret through a predetermined arc of its orbital travel.

8. A container body forming machine including in combination, a rotatably mounted turret having a hollow hub section, a body supporting mandrel mounted on and extending radially from the hub section of said turret, winding, spinning and stripping stations arranged in spaced relationship along the orbital path of travel of said mandrel as defined by the rotating movement of said turret, said mandrel shell having an axially extending bore therein, a spinning nose slidably mounted in the bore of the mandrel shell, means for resiliently maintaining said spinning nose projecting from the free end of said mandrel shell, a latching device within the mandrel shell for releasably maintaining said spinning nose in retracted position therein, means at said spinning station for pushing the spinning nose inwardly to retracted position and into latching engagement with said latching device, a latch release device associated with said mandrel and extending into the hub section of the turret, and means within the hub section for manipulating said latch release device and thereby releasing the spinning nose from retracted position when the mandrel is orbitally advancing from the stripping station to the winding station.

9. A container body forming machine including in combination, a rotatably mounted turret having a hollow hub section, a series of spaced body supporting mandrels mounted in radial spaced relationship on the hub section of said turret, winding, spinning and stripping stations arranged in spaced relationship along the orbital path of travel of said mandrels as defined by the rotating movement of said turret, each of said mandrels including a mandrel shell having an axially extending bore therein, a spinning nose slidably mounted in the bore of each mandrel shell, means for resiliently maintaining said spinning nose projecting from the free end of said mandrel shell, a latching device within the mandrel shell for releasably maintaining said spinning nose in retracted position therein, means at said spinning station for pushing the spinning nose inwardly to retracted position and in latching engagement with said latching device, a latch release device associated with each of said mandrels and extending into the hub section of the turret, and means within the hub section for manipulating said latch release device and thereby release the spinning nose from retracted position when the successive mandrels are successively advanced from the stripping station to the winding station.

10. A container body forming machine including in combination, a spinning station, a tubular body supporting mandrel, a spinning head at said spinning station fixed to the end of a rotatable shaft, a bearing sleeve for said shaft permitting axial shifting movement of said shaft, power means for rotating said shaft, a casing enclosing said bearing sleeve, a bearing block axially movable within said casing providing further bearing support for said shaft, and mechanism for axially shifting said bearing block in said casing to thereby axially advance said spinning head into progressive spinning engagement with the tubular body as supported by said mandrel at the spinning station.

11. A container body forming machine including in combination, a spinning station, a tubular body supporting mandrel, a spinning head at said spinning station fixed to the end of a rotatable shaft, a bearing sleeve for said shaft permitting axial shifting movement of said shaft, power means for rotating said shaft, a fixed casing enclosing said bearing sleeve, a bearing block axially movable within said casing providing further bearing support for said shaft, a lever arm supported by a stationary pivot, links connecting said lever arm to said bearing block, driving mechanism for manipulating said lever arm to thereby axially advance said spinning head into progressive spinning engagement with the tubular body as supported by said mandrel at the spinning station, and resilient means for retracting said spinning head from the mandrel.

12. A container body forming machine including in combination, a spinning station, a tubular body supporting mandrel, a conveyor for supporting the mandrel at said spinning station, a spinning head at said spinning station fixed to the end of a rotatable shaft, a bearing sleeve for said shaft permitting axial shifting movement of said shaft, power means for rotating said shaft, a fixed casing enclosing said bearing sleeve, a bearing block axially movable within said casing providing further bearing support for said shaft, a pair of pivotally mounted lever arms, links connecting said lever arms to said bearing block, driving mechanism for manipulating said lever arms to axially advance said spinning head into progressive spinning engagement with the tubular body as supported by said mandrel at the spinning station, and resilient means connected to said lever arms for retracting said spinning head from said mandrel.

13. A container body forming machine including in combination, a rotatably mounted turret having a series of spaced body supporting mandrels mounted in radial spaced relationship, a spinning station, turret driving mechanism operative to rotate said turret in stages to successively advance said body supporting mandrels to and from said spinning station, means associated with said turret driving mechanism for establishing a predetermined interval of dwell of the successive body supporting mandrels at said spinning station, a spinning head at said spinning station, means for axially moving said spinning head into and out of spinning engagement with the mandrel supported body in dwelling position at said spinning station, and mechanism for manipulating said spinning head moving means in synchronized relation to said turret driving mechanism whereby to axially move the spinning head in time relation to the interval of dwell of the successive body supporting mandrels at the spinning station.

14. A container body forming machine including in combination, a rotatably mounted turret having a series of spaced body supporting mandrels mounted in radial spaced relationship, a spinning station, turret driving mechanism operative to rotate said turret in stages to successively advance said body supporting mandrels to and from said spinning station, means associated with said turret driving mechanism for establishing a predetermined interval of dwell of the successive body supporting mandrels at said spinning station, a spinning head at said spinning station fixed to the end of a rotatable shaft, means for rotating said shaft and spinning head, means for guiding the axial movement of said shaft, means for axially advancing said spinning head into progressive spinning engagement with the tubular body as supported by the mandrel residing at the spinning station, resilient means for retracting the spinning head from the mandrel, and mechanism for manipulating said spinning head moving means in synchronized relation to said turret driving mechanism whereby to axially advance the spinning head in timed relation to the interval of dwell of the successive body supporting mandrels at the spinning station.

15. A container body forming machine including in combination, a winding station, a rotatably mounted mandrel, means for advancing said winding mandrel to and from winding position at said winding station, and means for pneumatically pressing the advancing end of a body forming blank into winding engagement with said mandrel, said pneumatic means including a plurality of spaced air directing arms, means for supplying compressed air to said air arms, and pneumatic means for manipulating said air arms into and out of operating position during the interval of residence of the mandrel at the winding station.

16. A container body forming machine including in combination, a winding station, a rotatably mounted mandrel, means for advancing said winding mandrel to and from winding position at said winding station, a driven pressure roller adjacent said mandrel designed to have pressure rolling contact with body forming blanks being wound on said mandrel, and means for pneumatically pressing the advancing ends of paired body forming blanks into gripping engagement between said pressure roller and said mandrel, said pneumatic means including a plurality of spaced compressed air directing arms, a mounting for swingably supporting said air arms, means for supplying compressed air to said air arms, automatic means for manipulating said air arms into and out of operating position during the interval of residence of the mandrel at the winding station, and automatic means for controlling the flow of compressed air to said air arms during the interval said air arms are in operating position.

17. A container body forming machine including in combination, a winding station, a rotatably mounted mandrel, means for advancing said winding mandrel to and from winding position at said winding station, a pressure roller rotatably mounted at said winding station operative to have pressing engagement with the winding mandrel when in winding position, means for rotating said pressure roller, means for pneumatically pressing the advancing end of a body forming blank into gripping engagement between the pressure roller and the mandrel, said pneumatic means including a plurality of spaced air directing arms, a mounting for swingably supporting said air arms, means for supplying compressed air to said air arms, automatic means for manipulating said air arms into and out of operating position during the interval of residence of the mandrel at the winding station, and automatic means for controlling the flow of compressed air to said air arms during the interval said air arms are in operating position.

18. A container body forming machine including in combination, a winding station, a rotatably mounted mandrel, means for advancing said winding mandrel to and from winding position at said winding station, means for feeding paired blanks to said winding station, a pair of pressure rollers rotatably mounted at said winding station operative to have pressing engagement with the winding mandrel when in winding position therebetween, means for rotating said pressure rollers, means for pneumatically pressing the advancing ends of said paired blanks into gripping engagement between one of said pressure rollers and the mandrel, said pneumatic means including a plurality of spaced air directing arms, a mounting for swingably supporting said air arms, means for supplying compressed air to said air arms, automatic means for manipulating said air arms into and out of operating position during the interval of residence of the mandrel at the winding station, and automatic means for controlling the flow of compressed air to said air arms during the interval said air arms are in operating position.

19. A container body forming machine including in combination, a winding station, a rotatably mounted mandrel, means for advancing said winding mandrel to and from residence position at said winding station, a finger assembly for guiding a body forming blank around the mandrel, said finger assembly including a rotatable support, a plurality of spaced guide arms fixed to and laterally extending from said support, each of said guide arms supporting a resilient finger element arcuately shaped to substantially conform to the adjacent surface section of the mandrel, means for adjustably supporting each of said finger elements from its associated guide arm for floating engagement with the blanks undergoing winding on the mandrel, means for pneumatically pressing the advancing end of said body forming blank into engagement with the mandrel, said pneumatic means including a plurality of spaced air arms laterally projecting from said rotatable support, and automatic means for manipulating said rotatable support to swing said finger elements into and out of mandrel embracing position and simultaneously swing said air arms into blank directing position during the interval of residence of the mandrel at the winding station.

20. A container body forming machine including in combination, a winding station, a rotatably mounted mandrel, means for advancing said winding mandrel to and from residence position at said winding station, a pressure roller rotatably mounted at said winding station operative to have pressing engagement with the winding mandrel when in winding position, means for rotating said pressure roller, a finger assembly for guiding a body forming blank around the mandrel, said finger assembly including a rotatable support, a plurality of spaced guide arms fixed to and laterally extending from said support, each of said guide arms supporting a resilient finger element arcuately shaped to substantially conform to the adjacent surface section of the mandrel, means for adjustably supporting each of said finger elements from its associated guide arm for floating engagement with the blank undergoing winding on the mandrel, means for pneumatically pressing the advancing end of the body forming blank into gripping engagement between the pressure roller and the mandrel, said pneumatic means including a plurality of spaced air arms laterally projecting from said rotatable support, automatic means for manipulating said rotatable support to swing said finger elements into and out of mandrel embracing position and simultaneously swing said air arms into blank directing position during the interval of residence of the mandrel at the winding station.

21. A container body forming machine including in combination, a winding station, a rotatably mounted mandrel, means for advancing said winding mandrel to and from residence position at said winding station, a pair of pressure rollers rotatably mounted at said winding station operative to have pressing engagement with the winding mandrel when in winding position therebetween, means for rotating said pressure rollers, a pair of finger assemblies for guiding a body forming blank around the mandrel, each of said finger assemblies including a rotatable support, a plurality of spaced guide arms fixed to and laterally extending from said support, each of said guide arms supporting a resilient finger element arcuately shaped to substantially conform to the adjacent surface section of the mandrel, means for adjustably supporting each of said finger elements from its associated guide arm for floating engagement with the blank undergoing winding on the mandrel, means for pneumatically pressing the advancing end of said body forming blank into gripping engagement between one of said pressure rollers and the mandrel, said pneumatic means including a plurality of spaced air arms laterally projecting from one of said rotatable supports, automatic means for manipulating said rotatable supports to swing said finger elements into and out of mandrel embracing position and simultaneously swing said air arms into blank directing position during the interval of residence of the mandrel at the winding station.

22. A container body forming machine including in combination, a winding station, a rotatably mounted mandrel, means for advancing said winding mandrel to and from residence position at said winding station, a finger assembly for guiding a body forming blank around the mandrel, said finger assembly including a rotatable support, a plurality of spaced guide arms fixed to and laterally extending from said rotatable support, each of said guide arms supporting a resilient finger element arcuately shaped to substantially conform to the adjacent surface section of the mandrel, pneumatic means for manipulating said rotatable support whereby to swing the finger elements into and out of mandrel embracing position during the interval of residence of the mandrel at the winding station, and means for cushioning the final increment of swinging movement of said finger elements as the finger elements approach mandrel embracing position.

23. A container body forming machine including in combination, a winding station, a rotatably mounted mandrel, means for advancing said winding mandrel to and from residence position at said winding station, a finger assembly for guiding a body forming blank around the mandrel, said finger assembly including a rotatable support, a plurality of spaced guide arms fixed to and laterally extending from said rotatable support, each of said guide arms supporting a resilient finger element arcuately shaped to substantially conform to the adjacent surface section of the mandrel, pneumatic means for manipulating said rotatable support whereby to swing the finger elements into and out of mandrel embracing position during the interval of resildence of the mandrel at the winding station, said pneumatic means including an air piston operably connected to said rotatable support, means for dampening the finel increment of swinging movement of said finger assembly as the finger elements thereof approach mandrel embracing position, and a control valve for controlling the flow of compressed air to said air piston in synchronism with said mandrel advancing means.

24. A container body forming machine including in combination, a winding station, a rotatably mounted mandrel, means for advancing said winding mandrel to and from residence position at said winding station, a pair of finger assemblies for guiding body forming blanks around the mandrel, each of said finger assemblies including a rotatable support, a plurality of spaced guide arms fixed to and laterally extending from said rotatable support, each of said guide arms supporting a resilient finger element arcuately shaped to substantially conform to the adjacent surface section of the mandrel, means for adjustably supporting each of said finger elements from its associated guide arm for floating engagement with the blanks undergoing winding on the mandrel, and pneumatic means for manipulating said rotatable supports in unison whereby to swing the finger elements associated with said finger assemblies into and out of mandrel embracing position during the interval of residence of the mandrel at the winding station, said pneumatic means including an air piston operably connected to said rotatable supports, pneumatic means for dampening the final increment of swinging movement of said finger assemblies as the finger elements thereof approach mandrel embracing position, and a control valve for controlling the flow of compressed air to said air piston in synchronism with said mandrel advancing means.

25. A container body forming machine including in combination, a rotatably mounted turret having a series of tubular body supporting mandrels mounted in radial spaced relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, a body stripping device at said stripping station, means guiding said stripping device for reciprocating movement of the latter, and pneumatic means operating in synchronism with said turret driving mechanism for manipulating said stripping device to strip the tubular body from its supporting mandrel during the interval of residence of the successive body supporting mandrels at the stripping station.

26. A container body forming machine including in combination, a rotatably mounted turret having a series of tubular body supporting mandrels mounted in radial spaced relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, stripping elements at said stripping station, means guiding said stripping elements for reciprocating movement of the latter, means for moving said stripping elements into and out of stripping engagement with the mandrel supported tubular body, and pneumatic means operating in synchronism with said turret driving mechanism for manipulating said stripping elements to strip the tubular body from its supporting mandrel during the interval of residence of the successive body supporting mandrels at the stripping station.

27. A container body forming machine including in combination, a rotatably mounted turret having a series of tubular body supporting mandrels mounted in radial relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, a stripping device at said stripping station, means guiding said stripping device for reciprocating movement of the latter, pneumatic means for manipulating said stripping device to strip the tubular body from its supporting mandrel during the interval of residence of the mandrel at the winding station, and means for controlling the flow of compressed air to said manipulating means driven in synchronism with said turret driving mechanism to effect stripping removal of the mandrel supported tubular bodies during residence of the successive mandrels at the stripping station.

28. A container body forming machine including in combination, a rotatably mounted turret having a series of tubular body supporting mandrels mounted in radial spaced relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, a stripping device at said stripping station, means guiding said stripping device for reciprocating movement of the latter, means including a reciprocating rack member operative to reciprocate said stripping device, an air cylinder for reciprocating said rack member in one direction, and resilient means for reciprocating said rack member in the opposite direction.

29. A container body forming machine including in combination, a rotatably mounted turret having a series of tubular body supporting mandrels mounted in radial spaced relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, a stripping device at said stripping station, means guiding said stripping device for reciprocating movement of the latter, means including a reciprocating rack member operative to reciprocate said stripping device, an air cylinder for reciprocating said rack member, a compressed air supply line for said air cylinder, and means operating in synchronism with said turret driving mechanism to control the flow of compressed air to said air cylinder when the successive body supporting mandrels are in a position of residence at said stripping station.

30. A container body forming machine including in combination, a rotatably mounted turret having a series of tubular body supporting mandrels mounted in radial spaced relationship, a stripping station, turret driving mechanism operative to rotate said turret in stages to successively advance said body supporting mandrels to and from said stripping station, means associated with said turret driving mechanism for establishing a predetermined interval of dwell of the successive body supporting mandrels at said stripping station, a stripping device at said stripping station, means guiding said stripping device for reciprocating movement of the latter, means including a rack member operative to reciprocate said stripping device, an air cylinder for reciprocating said rack member in one direction to impart a stripping stroke to said stripping device, resilient means for reciprocating said rack member in the opposite direction to impart a return stroke to said stripping device, a compressed air supply line for said air cylinder, a valve for controlling the flow of compressed air to said air cylinder, and means operating in synchronism with said turret driving mechanism to manipulate said air valve and admit compressed air to said air cylinder when the successive body supporting mandrels are in a position of residence at said stripping station.

31. An improved container body forming mandrel including, a body supporting shell having an axially extending bore, a hollow trunnion extending into one end of said mandrel shell having means for rotatably supporting the mandrel shell thereon, a spinning nose slidably fitting within the bore of the mandrel shell at the other end thereof, said spinning nose having a spinning groove in the projecting end thereof, resilient means within the bore of said mandrel shell for normally retaining the spinning nose in predetermined projecting position, a latch device within said mandrel shell operative to latch said spinning nose in retracted position, means extending through said hollow trunnion and projecting from the base end of said mandrel shell for manipulating said latch device, and means associated with said nose and said latch device for cushioning said nose against impact when said nose returns to its projecting position.

32. A container body forming machine including in combination, a winding station, a rotatably mounted mandrel, means for advancing said winding mandrel to and from winding position at said winding station, a pair of rotatably driven pressure rollers for feeding paired body forming blanks into winding engagement with said mandrel, a pair of finger assemblies for guiding the blanks around the mandrel, each of said finger assemblies including a plurality of spaced finger elements arcuately shaped to substantially conform to the adjacent surface of the mandrel, the finger elements of said finger assemblies being designed to jointly embrace the greater part of the circumference of the mandrel when said finger assemblies are in operating position, and automatic means for manipulating said finger assemblies in unison to move the finger elements thereof into and out of mandrel embracing position during the interval of residence of the mandrel at the winding station, said pressure rollers having grooves around their circumference, said grooves being axially spaced in conformity with the spacing of said finger elements whereby the tips of said finger elements project into said grooves when the finger elements are in mandrel embracing position thereby providing positive guidance to the leading edge of a blank being wound on said mandrel as said blank emerges from pressing contact between said mandrel and said pressure rollers.

BRUNO A. WITTKUHNS.
H. GEORGE D. NUTTING.
GILBERT F. HILL.

References Cited in the file of this patent

UNITED STATES PATENTS

| Number | Name | Date |
|---|---|---|
| 945,875 | Thompson | Jan. 11, 1910 |
| 1,186,466 | Brown | June 6, 1916 |
| 1,776,263 | Marcalus | Sept. 23, 1930 |
| 2,001,177 | Bodor | May 14, 1935 |
| 2,022,309 | Bodor | Nov. 26, 1935 |
| 2,083,210 | Wood | June 8, 1937 |
| 2,163,318 | Scusa | June 20, 1939 |
| 2,216,331 | Swallow | Oct. 1, 1940 |
| 2,321,407 | Merta | June 8, 1943 |

FOREIGN PATENTS

| Number | Country | Date |
|---|---|---|
| 425,750 | Great Britain | Mar. 20, 1935 |